United States Patent [19]
Ide et al.

[11] Patent Number: 5,590,365
[45] Date of Patent: Dec. 31, 1996

[54] PIPELINE INFORMATION PROCESSING CIRCUIT FOR FLOATING POINT OPERATIONS

[75] Inventors: Nobuhiro Ide, Tokyo-to; Takeshi Yoshida, Kanagawa-ken; Yoshihisa Kondo, Kanagawa-ken; Masato Nagamatsu, Kanagawa-ken; Junji Mori, Kanagawa-ken; Itaru Yamazaki, Kanagawa-ken, all of Japan

[73] Assignee: Kabushiki Kaisha Toshiba, Kawasaki, Japan

[21] Appl. No.: 408,125

[22] Filed: Mar. 21, 1995

Related U.S. Application Data

[63] Continuation of Ser. No. 678,711, Apr. 1, 1991, abandoned.

[30] Foreign Application Priority Data

Mar. 30, 1990 [JP] Japan .................................. 2-084721
Jun. 7, 1990 [JP] Japan .................................. 2-147499

[51] Int. Cl.⁶ ............................................... G06F 7/38
[52] U.S. Cl. ................... 395/394; 395/563; 395/800; 364/748; 364/736
[58] Field of Search ............................. 395/800, 375; 364/748, 736

[56] References Cited

U.S. PATENT DOCUMENTS

| 4,722,049 | 1/1988 | Lahti | 395/375 |
| 4,825,400 | 4/1989 | Simoncic et al. | 364/748 |
| 4,872,131 | 10/1989 | Kubota et al. | 364/736 |
| 4,977,534 | 12/1990 | Takahashi | 364/748 |
| 4,991,131 | 2/1991 | Yeh et al. | 364/748 |
| 5,053,631 | 10/1991 | Perlman et al. | 364/736 |

FOREIGN PATENT DOCUMENTS 49-130640  11/1974  Japan .

Primary Examiner—Alyssa H. Bowler
Assistant Examiner—John Harrity
Attorney, Agent, or Firm—Foley & Lardner

[57] ABSTRACT

Disclosed is a pipeline information processing circuit which comprises a register control unit for outputting a plurality of data held in registers at a time; an arithmetic operation unit for carrying out a collective arithmetic operation of a plurality of data; and a bypass control unit for comparing an operation result outputted from the arithmetic operation unit and a data outputted from the register control unit, selecting a data to be an object of the next arithmetic operation, and transferring the selected data to the arithmetic operation unit through a suitable bypass.

22 Claims, 22 Drawing Sheets

FIG.13

DISCARDING OR RAISING MODE

| DISCARDING OR RAISING MODE | SIGNAL MD [1:0] | CONTENTS |
|---|---|---|
| DISCARDING OR RAISING TO THE NEAREST VALUE | 1  1 | A DATA TO BE PROCESSED IS DISCARDED OR RAISED TO THE NEAREST VALUE TO THE CLOSE SOLUTION. WHEN AN INTERMEDIATE VALUE BETWEEN TWO FOATING-DECIMAL-POINT NUMERICAL VALUES IS DISCARDED OR RAISED TO A CORRESPONDING EVEN NUMBER. |
| DISCARDING OR RAISING IN THE 0 DIRECTION | 1  0 | THE ABSOLUTE VALUE OF A DATA TO BE PROCESSED IS DISCARDED OR RAISED TO A VALUE SMALLER THAN THE CLOSE VALUE. |
| DISCARDING OR RAISING IN THE POSITIVE DIRECTION | 0  0 | A DATA TO BE PROCESSED IS DISCARDED OR RAISED TO A VALUE LARGER THAN THE CLOSE SOLUTION. |
| DISCARDING OR RAISING IN THE NEGATIVE DIRECTION | 0  1 | A DATA TO BE PROCESSED IS DISCARDED OR RAISED TO A VALUE SMALLER THAN THE CLOSE SOLUTION. |

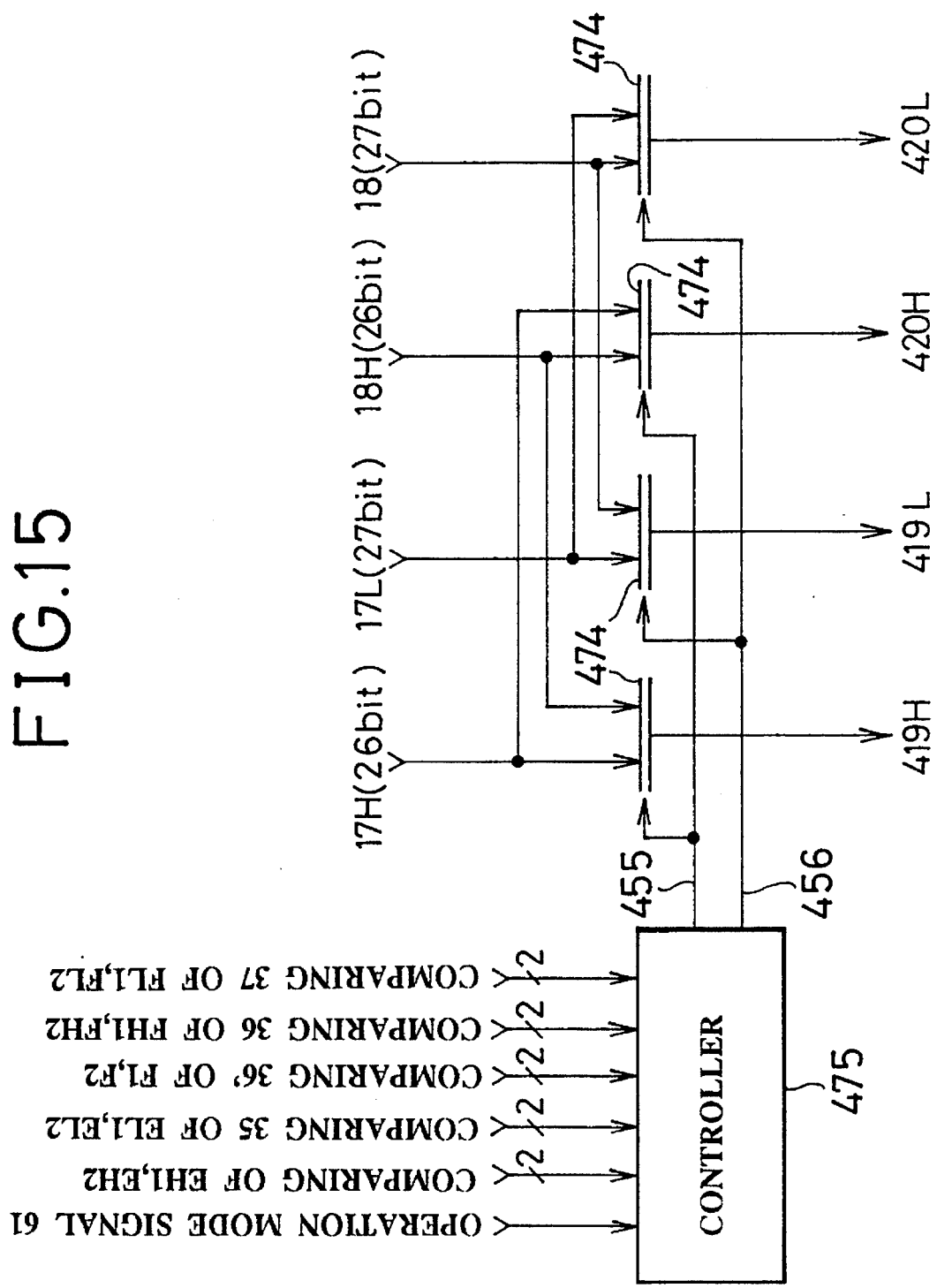

FIG.17

JUDGEMENT LOGIC OF INCREMENT BY DISCARDING OR RAISING

| DISCARDING OR RAISING MODE | MARK OF SOLUTIONS | L | M | S | PROCESS |
|---|---|---|---|---|---|
| DISCARDING OR RAISING TO THE NEAREST VALUE | — | — | 0 | 0 | DISCARDING |
| | — | — | 0 | 1 | DISCARDING |
| | — | 0 | 1 | 0 | DISCARDING |
| | — | 1 | 1 | 0 | INC |
| | — | — | 1 | 1 | INC |
| DISCARDING OR RAISING IN THE 0 DIRECTION | 0 | — | — | — | DISCARDING |
| | 0 | — | 0 | 0 | DISCARDING |
| | 0 | — | 0 | 1 | INC |
| | 1 | — | 1 | 1 | INC |
| DISCARDING OR RAISING IN THE POSITIVE DIRECTION | 0 | — | — | — | DISCARDING |
| | 1 | — | 0 | 0 | DISCARDING |
| | 1 | — | 0 | 1 | INC |
| | 1 | — | 1 | 1 | INC |
| DISCARDING OR RAISING IN THE NEGATIVE DIRECTION | | | | | |

PIPELINE INFORMATION PROCESSING CIRCUIT FOR FLOATING POINT OPERATIONS

This application is a continuation of application Ser. No. 07/678,711, filed Apr. 1, 1991, abandoned.

BACKGROUND OF THE INVENTION

1. Field of the Invention

The present invention relates to a pipeline information processing circuit for processing data based on a pipeline processing method, and particularly to an information processing circuit which can process a plurality of data collectively with an arithmetic unit.

2. Description of the Prior Art

Recently, processors based on the RISC (Reduced Instruction Set Computer) method have been widely spread. One of the reasons is that a pipeline processing method is used in the RISC system.

FIG. 1 is a block diagram of a conventional pipeline information processing circuit which is used in a typical RISC system.

As shown in the same drawing, this pipeline information processing circuit is operated with four pipeline stages comprising an instruction fetch stage (hereinafter, called F stage), a decode stage (D stage), a process execution stage (E stage) and a write-back stage to a register file 31 (W stage).

In such construction, a source data read out from the register file 31 in the D stage is latched by input registers 35a, 35b of an arithmetic unit 33 at the end of this stage. Then, the result of an arithmetic operation is outputted to an output register 37 at the end of the E stage, and the operation result is written back to the register file 31 at the end of the W stage.

Moreover, data buses 301, 303 are provided as data bypasses through which data from the arithmetic unit 33 and output register 37 are transmitted respectively. These bypasses are controlled by a bypass control section 39. FIG. 2 is a block diagram of the bypass control section 39, and FIG. 3 is a tiring chart for explaining a process in the bypass control section 39.

As shown in FIG. 3, in an execution flow 1, data corresponding to register numbers F0, F1 in the register file 31 are respectively read by the input registers 35a, 35b in the D stage. Then, the operation result obtained at the E stage is written back to a register number F2 in the register file 31 at the W stage.

While, at the D stage in another execution flow 2, a data of register number F2 is read in the input register 35a and a data of register number F3 in the register file 31 is read in the input register 35b. Then, the operation result obtained at the E stage is written back to a register number F4 in the register file 31.

In this case, when the data of register number F2 is read in the execution flow 2, one of the data of register number F2 in the E stage in the execution flow 1 is transmitted to the input register 35a through the data bus 301 as a bypass. At the time, in registers 41E, 41W are respectively held register numbers (hereinafter, called target register numbers) of the register file 31 to which the arithmetic operation results of the execution flow 1 are written back. Moreover, a target register number 305 of the E stage, which is held in the register 41E, is compared by a comparator 43 with a register number 307 of a data to be latched in the D stage in the execution flow 2.

Since, both of the target register number 305 and the register number 307 correspond to F2, a coincidence signal 309 is outputted to a priority judgement unit 45. Namely, the data bypass 301 of the E stage to the input register 35a is selected by a selector 47 in accordance with a result from the priority judgement unit 45.

Accordingly, when data whose register numbers coincide with each other are existent on the pipe lines, it is possible to start the process of execution flow 2 before the arithmetic operation result on the execution flow 1 is written back to the register file 31.

While, since the arithmetic operation unit 33, input registers 35a, 35b and output register 37 are arranged in such construction as shown in FIG. 4, each of the input registers 35a, 35b can process only one data in each process operation.

Namely, the arithmetic operation unit 33 which is used in such a conventional pipeline information processing circuit can process only one data in each process operation.

In other words, the conventional pipeline information processing circuit having such data bypass construction as mentioned above can transfer only one data in each data transfer process. Therefore, it has not been possible so far to process a plurality of data collectively at a time by an arithmetic operation unit. Accordingly, in such a case, a plurality of registers for accessing a plurality of data must be required when the data are supplied to an arithmetic operation unit from a register file or when the arithmetic operation results are stored in the register file. However, such construction inevitably degrades the pipeline process efficiency.

To solve this problem, there is a generally known method for high-speed transfer of a plurality of data, in which a register for holding the target register number has multi-bus port construction in which a plurality of data can be transferred in parallel through a plurality of data buses. However, in such a method, the register circuit must be complex, moreover, it is necessary to increase the comparators in proportion to the number of bypasses which is corresponding to the number of data. Accordingly, the size of the bypass control section inevitably becomes large.

Moreover, when the arithmetic operation unit is an arithmetic operation unit of floating point mode, there is a problem as mentioned below in the conventional technology.

Namely, according to such an arithmetic operation unit, a numeral value of the floating point mode is expressed as a marked absolute value which comprises an index part, a mantissa part and a mark of the mantissa part. For example, the double-precision numerical value D (64 bits) and the single-precision numerical value S (32 bits) defined in the standard of IEEE 754 are respectively expressed as follows:

$D = (-1)^s \times 1, f \times 2^{e-1023}$ s: 0 or 1 (1 bit)

F: 000 ... 00 to 111 ... 11 (52 bits)

e: 0 ... 2047 (11 bits)

$S = (-1)^s \times 1, f \times 2^{e-127}$ s: 0 or 1 (1 bit)

f: 000 ... 00 to 111 ... 11 (23 bits)

e: 0 to 255 (8 bits)

In the above expression, s designates a mark of the mantissa part, and is 0 when D (or S) is positive or is 1 when negative. Moreover, f shows a part below the decimal-point corresponding to the mantissa part, which is normalized so that the integer part corresponding to a hidden bit becomes 1, and e designates the index part, which is expressed in the offset mode where 1023 as a bias value in case of the double precision or 127 in case of the single precision is added to the original index value. FIGS. 5a and 5b show the formats respectively.

Incidentally, because of extremely complex process operation, the floating point arithmetic operation requires far much time for the execution as compared with a simple integer arithmetic operation. Moreover, it is very difficult to control the cost, required for the hardware package for realising desired execution speed and precision, within the actual trade level. Namely, in order to increase the operation speed and enhance the precision, the size of the arithmetic operation unit must be considerably large. In particular, in order to improve the precision of the mantissa part, it is necessary to enlarge the bit width so that the mantissa part operation section occupies the greater part of the arithmetic calculation unit, and the production cost is largely increased because of complexity of the calculation concerning the part. On the other hand, with respect to an index part operation section and a mark part operation section, each bit number corresponding to these parts is not so increased even if the precision thereto is increased. Moreover, since the operation of these two sections is simple in common, the area occupied thereby in the arithmetic operation unit is not so large as to be questioned.

FIG. 6 shows an example of conventional arithmetic operation units to be operated in the double-precision or single-precision mode. In the same drawing, this arithmetic operation unit comprises mark part operation means 500, index part operation means 501 and mantissa part operation means 502, each of which is respectively provided with an arithmetic operation unit comprising a bit width sufficient for directly carrying out the double-precision process on numeral data. Accordingly, in the highest speed mode, since a set of data can be inputted per clock irrespectively of double-precision numeral data or single-presion numeral data, one arithmetic operation result can be obtained to each clock.

In the arithmetic operation unit, the index part operation means 501 comprises, for example, an index part comparator 503, an index part selector 504, an adder-subtracter 505 and an incrementer 506, so as to carry out an arithmetic operation concerning the index part in accordance with input of a signal E of a bit width e shown in FIGS. 5a and 5b. While, the mantissa part operation unit 502 comprises, for example, a mantissa part exchanger 507, a digit adjusting shifter 508, an inversion circuit 509, an adder 510, a complement circuit 511, a normalizing shifter 512, a priority encoder 513, a discarding or raising circuit 514 and a renormalizing circuit 515.

Incidentally, the term of "discarding" means discarding a number of the smallest digit or figure of a numerical value into 0, or repetition of this process up to a suitable digit. While, the term of "raising" means that a number of the smallest digit of a numerical value is raised and 1 is added to a number of the secondly smallest digit in the value, or repetition of this process.

Moreover, to the mantissa part exchanger 507, a signal F of a bit width f shown in FIGS. 5a, 5b is inputted so as to carry out an arithmetic operation concerning the mantissa part.

As stated above, in the conventional floating point arithmetic operation unit of the double precision and single precision modes, since each of the index part operation means 501 and the mantissa part operation means 502 is provided an arithmetic operation unit of a bit width which sufficient for independently or directly carrying out a process operation of double-precision data, when a double-precision data comprising signals S, E, F is inputted as shown in FIG. 5a, the respective circuits calculate the floating-decimal-point numerical value based on predetermined operation modes. On the other hand, when a single-precision data comprising the signals S, E, F is inputted, parts of the respective operation means are used for the arithmetic operation concerning the floating point numerical value. Accordingly, in case of the data operation process in the single-precision mode, for example, with respect to the considerably expensive mantissa part operation means 502, only about a half part of the bit width thereof is used for the object, so that the hardware processing capacity is not utilized efficiently.

Incidentally, since the respective circuit parts in the conventional unit are similar to those used in embodiments related to the present invention on which detailed description will be given below, the explanation is omitted here.

Namely, in the conventional floating point arithmetic operation unit for correctively processing a plurality of numeral data either in the double-precision mode or in the single-precision mode, the processing capacity provided in the hardware system can not be utilized efficiently on the operation of single-precision numeral data.

SUMMARY OF THE INVENTION

Therefore, the present invention was made in view of the above-mentioned problem in the conventional technology, and it is an object thereof to provide a pipeline information processing circuit which can realize collective arithmetic operation of a plurality of data based on simultaneous transfer of these data.

Moreover, in order to solve the problem in the conventional floating point numerical operation unit related to the above-mentioned arithmetic operation, another object of the present invention is to provide a floating point numerical operation unit which can be made by addition of a relatively small scale hardware to an arithmetic operation unit capable of direct and collective process concerning the double-precision numeral data and can execute the process concerning the single-precision numeral data at a speed twice the operation speed in the conventional one.

To achieve the above objects, a first feature of the present invention is a pipeline information processing circuit which comprises register control means for collectively outputting a plurality of data which are held in a register, arithmetic operation means for calculating a plurality of data at a time, and bypass control means for comparing the operation result outputted from the arithmetic operation means with the data outputted from the register control means, and selecting a data as an object of the next operation and then transferring it to the arithmetic operation means through a suitable bypass.

Moreover, the bypass control means comprises a flag holding means for holding a flag for expressing effectiveness of a data, that is, each of data inputted to the arithmetic operation means is used in the arithmetic operation or not, comparison means for comparing a register number corresponding to an operation result from the arithmetic operation means with a register number corresponding to the object of the next operation, and selecting means for selecting an operation result outputted from the operation means as a data to be the object of the next operation when the comparison result of the comparison means shows that both of the register numbers are identical to each other and the flag designates a data which is used in the operation.

According to the above-mentioned construction, by the comparison means, the register number of a data which is subjected to an arithmetic operation by the arithmetic operation means is compared with the register number of a data to be an object of the next arithmetic operation. Moreover, when it is known from the comparison result that these two register numbers are identical to each other, and the flag held in the flag holding means designates a data which is used in the operation, the operation result is selected as a data to be an object of the next operation, and transmitted to the arithmetic operation means through a suitable bypass.

However, in the comparison result, when these register numbers are not identical to each other or when the flag does not designate a data which is used in the arithmetic operation, a data in the register corresponding to the register number of the data to be an object of the next operation is selected as a data to be an object of the next operation, and is transmitted to the arithmetic operation means.

Moreover, a second feature of the present invention is a floating point numerical operation unit which comprises mantissa-part operation means which is operated in a first operation mode for the double-precision numeral data operation, a second operation mode for the single-precision numeral data operation, and a third operation mode in which an operation field is divided into several parts so that different single-precision numeral data operations are carried out in the respective divided parts.

According to the above-mentioned construction, in the first operation mode is carried out an arithmetic operation with respect to a floating point numerical value by using first mark operation means, first index part operation means and mantissa part operation means, while in the second operation mode is carried out another arithmetic operation with respect to a floating point numerical value by using either the first or second mark operation means, either the first or second index part operation means and the mantissa part operation means, further in the third operation mode, in which arithmetic operations with respect to two sets of different single-precision numeral data are carried out at the same time, arithmetic operations with respect to two sets of floating point numerical values are carried out by using both of the first and second mark operation means, both of the first and second index Dart operation means and the mantissa part operation means.

These and other objects, features and advantages of the present invention will be more apparent from the following description of preferred embodiments, taken in conjunction with the accompanying drawings.

BRIEF DESCRIPTION OF THE DRAWINGS

FIGS. 13 and 17 are given to explain the operation of the unit shown in FIG. 11;

DETAILED DESCRIPTION OF THE EMBODIMENTS

Figure 7:
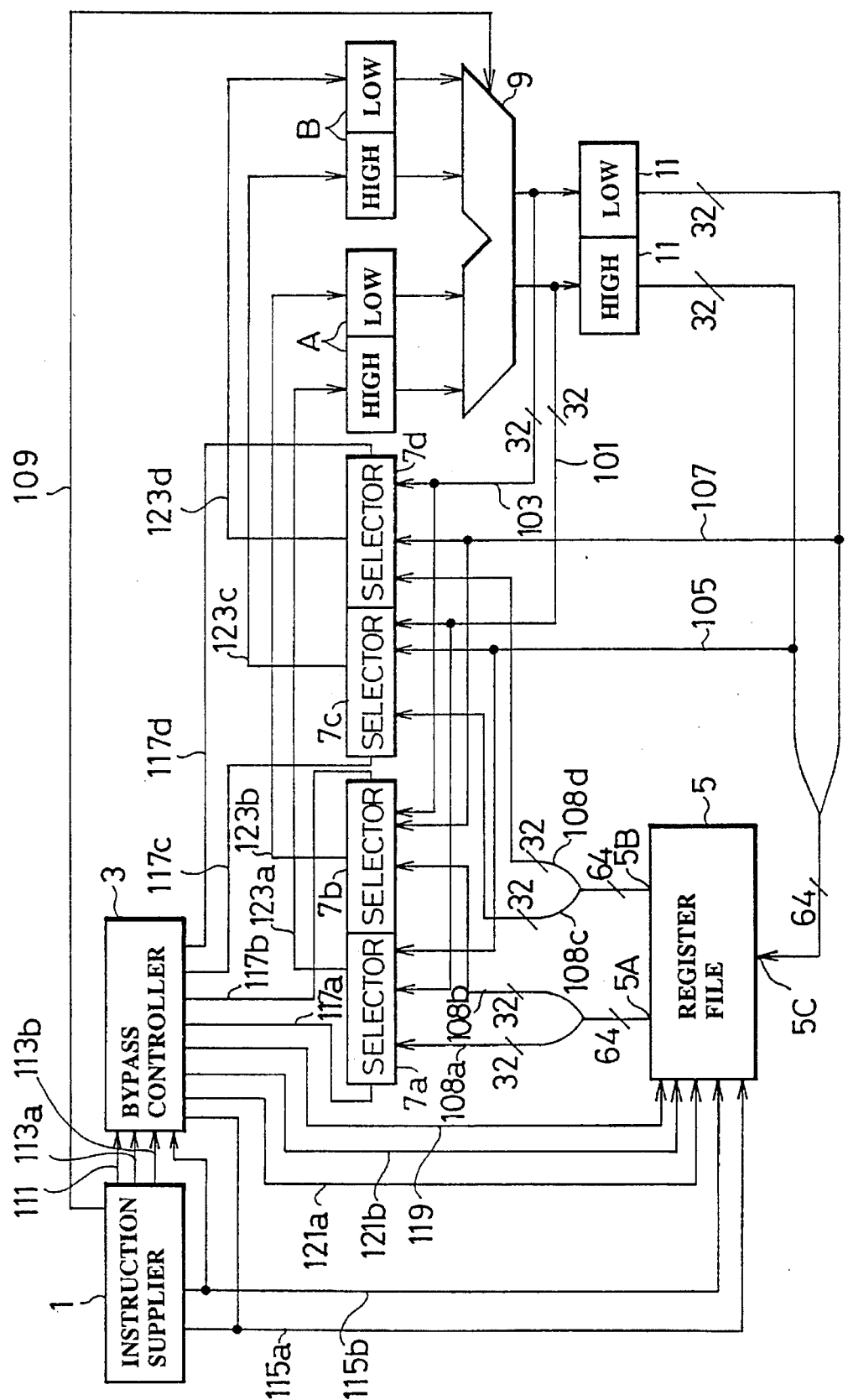
FIG. 7 is a block diagram to show an embodiment of a pipeline information processing circuit according to the present invention.

FIG. 7 shows a block diagram to show construction of an embodiment of a pipeline information processing circuit of the present invention.

As shown in the same drawing, the pipeline information processing circuit carryies out a pipeline process based on four stages comprising an instruction fetch stage (F stage), an instruction decode stage (D stage), a process execution stage (E stage) and a write-back stage (W stage).

Incidentally, the pipeline information processing circuit comprises an instruction supply unit 1, a bypass control section 3, a register file 5, selectors 7a to 7d, an arithmetic operation unit 9, an input data register A, an input data register B and an output data register 11. Moreover, on the output side of the arithmetic operation unit 9 are provided bypasses 101, 103, while to the output register 11 are connected bypasses 105 and 107 which are also connected to the respective selectors 7a to 7d.

The instruction supply unit 1 is so constructed as to output an arithmetic-operation instruction signal 109 to the arithmetic operation unit 9, a target register number 111, a higher-side flag 113a, a lower-side flag 113b and output data register numbers 115a, 115b to the bypass control section 3, further the output data register numbers 115a, 115b to the register file 5, in each cycle of the D stage.

The bypass control section 3 is one of important elements which construct the present invention. Though the detailed explanation will be given below, the control section 3 compares a data register number of the next arithmetic operation with a data register number exsistent in the present pipeline process. Moreover, the bypass control section gives to the respective selectors 7a to 7d selector control signals 117a to 117d for deciding whether a data existent on the pipeline is to be used through the respective bypasses or a data in the register file 5 is to be used, as a data to be processed in the next operation, based on the comparison result obtained from the bypass control section 3. Furthermore, the bypass control sention 3 also outputs a write register number 119 and flags 121a, 121b of W stage data to the register file 5.

The selectors 7a to 7d select data respectively, in accordance with the selector control signals 117a to 117d given from the bypass control section 3, from data bypassed from the arithmetic operation unit 9 through the bypasses 101, 103, data bypassed from the output data register 11 through the bypasses 105, 107, and data contained in the register file 5. Moreover, these selectors 7a to 7d transfer data 123a to 123d respectively selected thereby to the input register A or input register B.

On the other hand, the register file 5 comprises a plurality of registers, to each of which a register number is added. Moreover, the register file 5 comprises an output port 5A, an output port 5B and an input port 5C, and each register width or each port width thereof is 64 bits (for double-precision). In this case, when a double-precision data is held in each register for constructing the register file 5, all of the 64 bits are used. While, when a single-precision data is held, its held in a part corresponding to the higher 32 bits or in the other part corresponding to the lower 32 bits of each register. The bit width of each of data buses to be respectively connected to the output ports 5A, 5B and the input port 5C is 64 bits. Moreover, data buses 108a to 108d connected to the output ports 5A and 5B respectively input data to the selectors 7a to 7d.

While, the arithmetic operation unit 9 carries out arithmetic operations with respect to data given from the input data registers A and B, and outputs the operation results to the output register 11. Further, though the detailed explanation will be given below, the arithmetic operation unit 9 has a function for carrying out not only a single-precision (32 bit) operation or a double-precision (64 bit) operation, but also a simultaneous arithmetic operation on two single-precision numerical values. Incidentally, the above-mentioned simultaneous operation will be called single-precision-double-speed operation hereinafter.

Moreover, the input registers A, B and the output register 11 have 64 bit construction respectively, and each construction is divided into a higher 32-bit part and a lower 32-bit part.

Namely, in the single-precision-double-speed operation, two kinds of operations on data on the higher 32-bit side in the input data register A and on the higher 32-bit side in the input data register B are carried out as well as two kinds of operations on data on the respective lower 32-bit sides of these registers A and B. The operation results on the respective higher-side input data are outputted from the higher side in the output register 11, while the operation results on the respective lower-side input data are outputted from the lower side in the register 11.

In such construction, data corresponding to the input data register A, B are latched at the D stage on the pipeline, and those corresponding to the output data register 11 are latched at the E stage.

Figure 8:
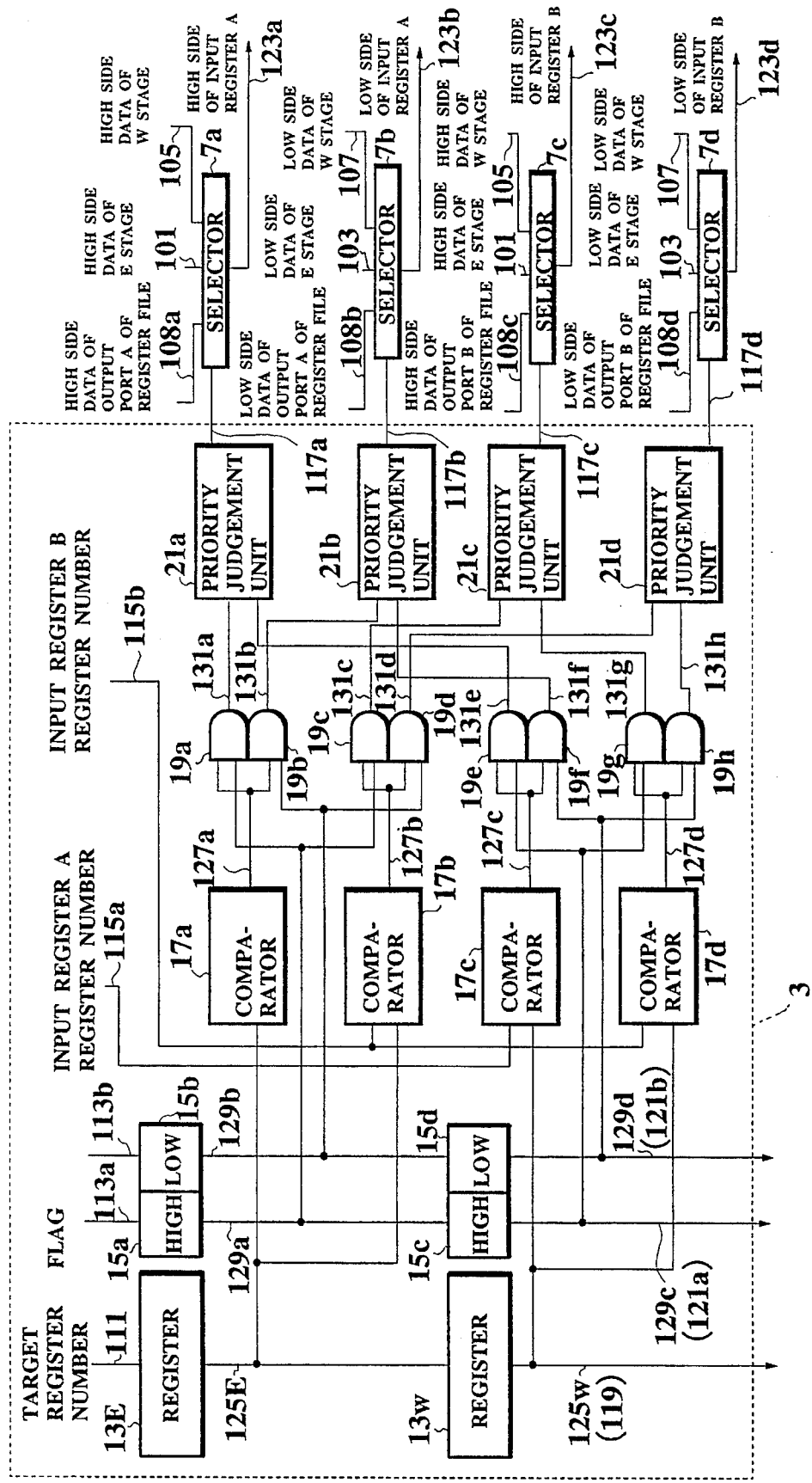
FIG. 8 is a block diagram to show an embodiment of construction including a bypass control section and a selector shown in FIG. 7.

FIG. 8 shows a detailed block diagram of the bypass control section 3.

As shown in the same drawing, the bypass control section comprises registers 13E, 13W, registers 15a to 15d, comparators 17a to 17d, AND circuits 19a to 19h and priority judgement units 21a to 21d. Incidentally, the selectors 7a to 7d are respectively the same as those shown in FIG. 7.

The register 13E latches a target register number corresponding to each process result on data contained in the input data register A or B on the E stage. While, the register 13W latches a target register number corresponding to each data contained in the output data register 11 on the W stage.

Moreover, the registers 15a, 15b hold flags respectively concerning data on the higher 32-bit side and the lower 32-bit side of each data register on the E stage. Likewise, the register 15c, 15d hold effective flags respectively concerning data on the higher and the lower side of the output register 11 on the W stage. With respect to each Flag, valid bits correspond to the higher or the lower side where the operation is actually carried out.

Furthermore, the registers 13E, 13W and the registers 15a to 15d also hold target register numbers and flags concerning data being transferred on the pipeline as well as those concerning data processed in the respective stages E, W. Incidentally, each of the respective registers carries out the data latch at the end of each stage.

Additionally, the comparators 17a to 17d compares register numbers in the register file 5, corresponding to input data which are transferred From the instruction supply unit 1 to the D stage so as to be used in the next operation, with target register numbers corresponding to data existent on the present pipeline. Namely, the comparators 17a to 17d respectively carry out judgement on whether or not data existent on the present pipeline are to be used in the next operation.

In more detail, the comparator 17a compares a register number 115a of a source data to be transferred to the input register A with a target register 125E number of the E stage. While, the comparator 17b compares a register number 115b of a source register to be transferred to the input register B with the target register number 125E. Likewise, the comparators 17c, 17d respectively compare a target register number 125W with the register numbers 115a and 115b.

Moreover, the AND circuits 19a to 19h respectively form logical products between coincidence signals 127a to 127d outputted from the comparators 17a to 17d and data flags 129a to 129d. Namely, when each register number in the register file 5 coincides with each target number of data existent on the present pipeline, these AND circuits 19a to 19h respectively judge whether the side of data used in the present operation is higher or lower. For example, the AND circuit 19a forms a logical product between the coincidence signal 127a from the comparator 17a and the flag 129a corresponding to data on the higher side of the E stage. Moreover, when the logical product is judged to be effective, the bypass condition for bypassing data on the higher side of the E stage to the input data register A is established. While, the AND circuit 19h forms a logical product between the coincidence signal 127d and the flag 129d corresponding to data on the lower side of the W stage. Moreover, when the result is judged to be effective, the bypass condition for bypassing data on the lower side of the W stage to the input data register B is established. Besides, the AND circuits 19a to 19h respectively output bypass demand signals 131a to 131h, related to judgement on whether or not each bypass condition is established, to the priority judgement units 21a to 21d.

In this case, the priority judgement units 21a to 21d respectively judge the priority of data respectively contained in the register file 5, the E stage on the present pipeline, and the W stage on the present pipeline, based on the bypass demand signals 131*a* to 131*h*. Incidentally, the priority of data is the highest in the E stage, the secondly highest in the W stage, and the lowest in the register file 5. Moreover, the priority judgement units 21*a* to 21*d* respectively give selector control signals 117*a* to 117*d* to the selectors 7*a* to 7*d* in order to select one of these three data base on the judgement result.

For example, the priority judgement unit 21*a* outputs the selector control signal 117*a* to the selector 7*a* so as to preferentially select a bypass data 101 on the higher side of E stage when the bypass demand signal 131*a* from the E stage is effective.

However, when the bypass demand signal 131*a* is not effective, but the bypass demand signal 131*e* from the W stage is effective, the selector control signal 117*a* is outputted to select a bypass data on the higher side of the W stage. Moreover, when both of the bypass demand signals 131*a* and 131*e* are not effective, the signal 117*a* is outputted to select a data 108*a* in the register file 5. Likewise, the other priority judgement units 21*b* to 21*d* respectively output the selector control signals 117*b* to 117*d* to the selectors 7*b* to 7*d* based on the data priority.

Namely, the selectors 7*a* to 7*d* are used to respectively select one data from these three kinds of data respectively existent in the register file 5, the E stage and the W stage, based on the selector control signals 117*a* to 117*d*. Moreover, the selectors 7*a* to 7*d* respectively output data 123*a* to 123*d* respectively selected thereby to the input data register A or B. For example, the selector 7*a* selects one data from the data 108*a* on the higher side as data read from the output port 5A in the register file 5, the data 101 of the higher side of the E stage and the data 105 on the higher side of the W stage, in accordance with the selector control signal 117*a*, then outputs the selected data 123*a* to the higher side of the input data register A. Likewise, the selectors 7*b* to 7*d* respectively output the selected data 123*b* to 123*d* to the lower side of the input data register A, and the higher and lower sides of the input data register B.

Next, the bypass operation of the above-mentioned embodiment of the pipeline information processing circuit according to the present invention is explained with reference to FIG. 9.

Figure 9:
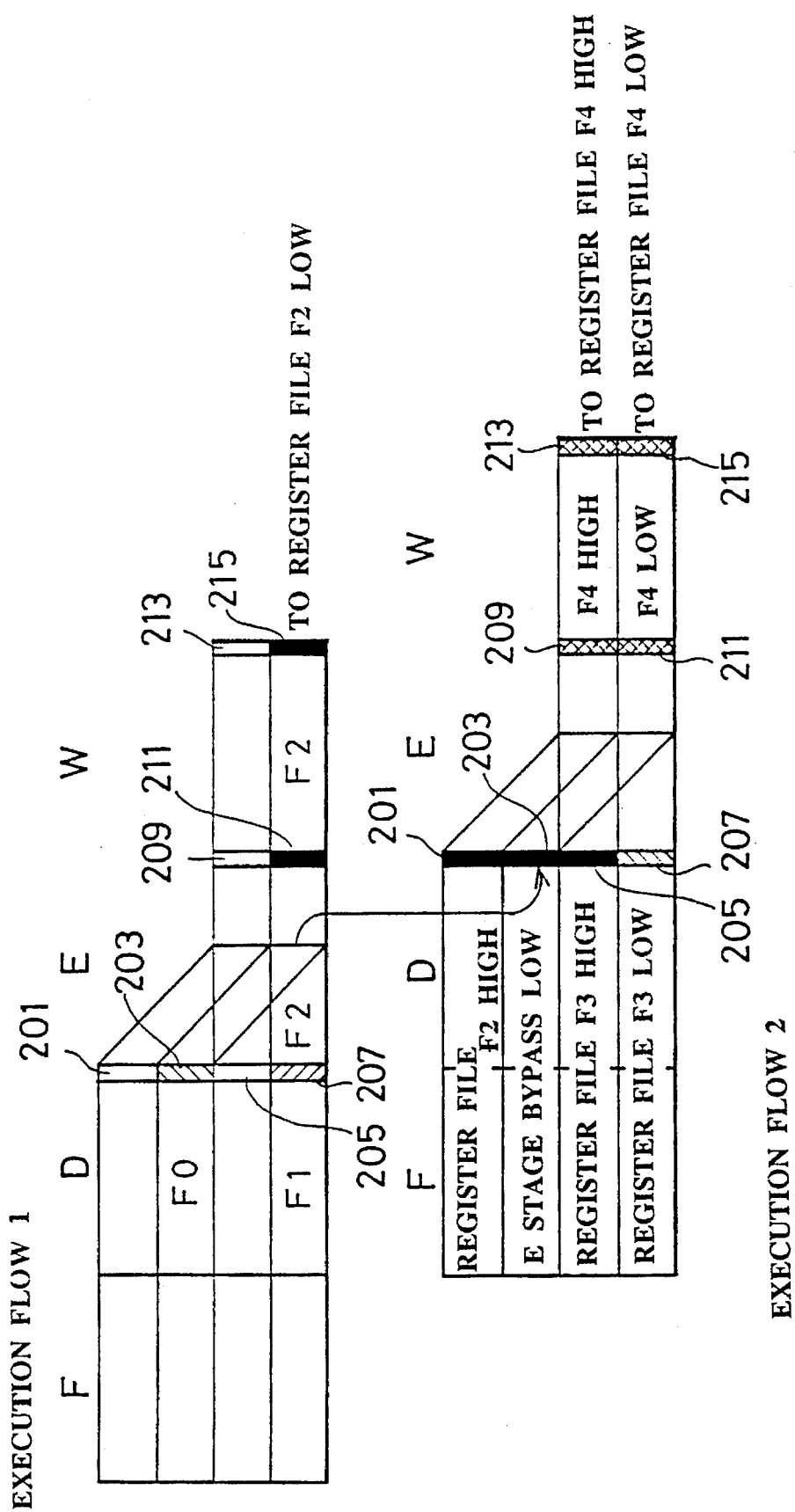
FIG. 9 is a timing chart to show an embodiment of pipeline process by means of the pipeline information processing circuit shown in FIG. 7.

As shown in FIG. 9, in an execution flow 1 on the present pipeline, a data of register number F2 is contained in the E stage for the single-precision arithmetic operation, while in an execution flow 2 is carried out an arithmetic operation for the single-precision-double-speed operation by using the data of register number F2 with data of register number F3 as data source, and the operation result is written back to a register number 4 of the register file 11. In this case, the data of register number F2 is used in the input data register A in the execution flow 2. Incidentally, the previous instruction to the execution flow 1 is NOP.

Moreover, as shown in FIG. 9, each of the execution flows 1 and 2 is divided into four stages of F, D, E and W. Furthermore, data 201 to 207 respectively designate data on the higher and lower sides of the input data register A and on the higher and lower sides of the input data register B. On the other hand, data 213, 215 respectively designate data on the higher and lower sides of the W stage. Besides, these timing charts show that a data 211 of register number F2 on the lower side of the E stage in the execution flow 1 is bypassed to the lower side of the D stage in the execution flow 2.

In the bypass operation, the register number F2 of the input data register A in the execution flow 2 is transferred from the instruction supply unit 1 to the register number 115*a* of the bypass control circuit 3. Likewise, the register number F3 of the input data register B is transferred to the register number 115*b*. Moreover, in the next stage, the register number F4 is transferred from the instruction supply unit 1 as target register number 111 to be latched on the E stage of the bypass control section 3.

Additionally, since the execution flow 2 is used for the single-precision-double-speed operation, signals as the flags 113*a*, 113*b* corresponding to the output data are transferred to both of the higher and lower sides of the flow 2.

In this case, the target register number F2 as the operation result in the execution flow 1 is already held in the register 13E on the E stage. Besides, since the execution flow 1 is used for the single-precision operation only on the lower side, valid bits correspond to only the register 15*b*.

In such a state, the register number 115*a* and the target register number 125E are compared with each other by the comparator 17*a*. In this case, since both of the register number 115*a* and the taget register number 125E are existent in F2, the coincidence signal 127*a* for showing effectiveness of operation is outputted to the AND circuits 19*a*, 19*b* from the comparator 17*a*.

At the same time, the comparison operations by means of the comparators 17*b* to 17*d* are carried out in parallel. In this case, since the register number 115*b* belongs to F3, the coincidence signal 127*b* to be outputted to the AND circuits 19*c*, 19*d* from the comparator 17*b* becomes ineffective. Moreover, since the W stage is NOP, the concidence signals 127*c*, 127*d* to be outputted from the comparators 17*c*, 17*d* also become ineffective.

Besides, with respect to the coincidence signal 127*a*, a logical product is formed together with the data-effectiveness flag 129*a* or 129*b* by means of the AND circuit 19*a* or 19*b*. Among the data-effectiveness flags 129*a*, 129*b*, since only the flag 129*b* on the lower side shows effectiveness of operation, the logical product formed by the AND circuit 19*b* is effective, however, the logical product formed by the AND circuit 19*a* becomes ineffective. Accordingly, the bypass demand signal 131*a* for showing ineffectiveness is outputted to the priority judgement unit 21*a* from the AND circuit 19*a*, while the bypass demand signal 131*b* for showing effectiveness is outputted to the priority judgement unit 21*b* from the AND circuit 19*b*.

Moreover, since all of the coincidence signals 127*b* to 127*d* outputted from the comparators 17*b* to 17*d* are ineffective, all of the bypass demand signals 131*c* to 131*h* to be outputted from the AND circuits 19*c* to 19*h* are also ineffective.

As the result, the data priority is judged at the respective priority judgement units 21*a* to 21*d* based on the bypass demand signals 131*a* to 131*h*. In this case, since the bypass demand signals 131*a*, 131*e* are ineffective together, the data priority in the register file 5 is judged to be the highest by the priority judgement unit 21*a*. Moreover, from the priority judgement unit 21*a*, the selector control signal 117*a* for selecting the data 108*a* in the register file 5 is outputted to the selector 7*a*. On the other hand, at the priority judgement unit 21*b*, since the bypass demand signal 131*b* is effective, the data priority on the lower side of the E stage is judged to be the highest. As the result, the selector control signal 117*b* for selecting the bypass data 103 on the lower side of the E stage is outputted to the selector 7*b*.

Besides, in this case, since the bypass demand signals 131*c*, 131*g*, 131*d*, 131*h* are all ineffective, the selector control signals 117*c*, 117*d* for selecting the data 108*c*, 108*d* in the register file 5 are respectively outputted to the selectors 7c, 7d from the priority judgement units 21c, 21d in the same manner as in the priority judgement unit 21a.

When the selector control signal 117a is inputted, the selector 7a selects the data 108a on the higher side of the register number F2, which is read from the output port 5A of the register file 5. Moreover, from the selector 7a, the selected data 123a is outputted to the higher side of the input data register A. On the other hand, the selector 7b selects the bypass data 103 on the lower side of the E stage in accordance with the selector control signal 117b, and the selected data 123b is outputted to the lower side of the input deta register A.

Moreover, the selectors 7c, 7d respectively select the data 108c on the higher side and the data 108d on the lower side of the register number F3, which are read from the output port 5B of the register file 5. Then, the selected data 123c, 123d are respectively outputted to the higher and lower sides of the input data register B.

In accordance with the output of these selected data 123a to 123d, the data which are bypassed from the output port 5A of the register file 5 are latched on the higher side of the input data register A in the execution flow 2, while the data bypassed from the lower side of the E stage are latched on the lower side of the register A. On the other hand, the data read from the output port 5B of the register file 5 are respectively latched on the higher and lower sides in the input data register B.

As stated above, the bypass operation is carried out by the bypass control circuit 3.

On the other hand, at the end of the pipeline process, the above mentioned data are written back to the respective registers in the register file 5. In this case, which data is to be written back to the respective register in the register file 5 is decided with reference to the target register number 125W (designated by reference numeral 119 in FIG. 7) on the W stage and the flags 129c, 129d respectively on the higher and lower sides (designated by reference numerals 121a, 121b in FIG. 7). Since only the lower side is subjected to the arithmetic operation in the execution flow 1, the higher side of the contents of register number F2 is held as such, while the lower side is renewed into a new data which is subjected to the operation in the execution flow 1.

Accordingly, data on both of the higher and lower sides can be bypassed at the same time by the bypass control section 3.

As stated above, according to the pipeline information process control circuit of the present invention, the register number of each data on the present operation is compared with the register number of a data to be an object of the next operation, and only when these two register numbers are identical to each other and the respective flags designate that the data is actually subjected to the present operation, the operation result is transferred to the arithmetic operation unit through a suitable bypass as a data to be an object of the next operation. Accordingly, a collective arithmetic operation on a plurality of data can be carried out by increase of a small number of circuits for simultaneous bypass transfer of these data.

Next, an embodiment of an arithmetic operation unit when the operation unit 9 shown in FIG. 7 is a floating point numerical operation unit is described with reference to FIG. 10.

As shown in the same drawing, the arithmetic operation unit comprises mantissa part operation means 401, first index part operation means 402 used for the double-precision or the single-precision numerical operation, second index operation means 403 exclusively used for the single-precision numerical operation, first mark part operation means 459 for the single-precision or the double-precision numerical operation, and second mark part operation means 460 exclusively used for the single-precision numerical operation.

The mantissa part operation means 401 comprises a mantissa part comparator 404 (for largeness comparison), a mantissa part exchanger 405, a digit adjusting circuit 406 (a barrel shifter), a bit inverter 407, an adder 408, a priority encoder 409 and a normalization circuit 410. In this case, each of these circuit elements is divided into two fields, that is, a first and a second field. However, it is also possible to connect these respective first and second fields into one field. Incidentally, the division of each circuit element into the first and the second field can be realized with ease with little hardware.

The first index part operation means 402 comprises a first index part comparator 411, a first index part arithmetic operation unit 412 and a first index part selector 413, all of which are provided with bits whose number is sufficient for the double-precision numerical operation.

The second index part operation means 403 comprises a second index part comparator 414, a second index part operation unit 415 and a second index part selector 416, all of which are provided with bits whose number is sufficient at least for the single-precision numerical operation.

Moreover, the first mark part operation means 459 comprises a first mark part operation unit 462 provided with bits sufficient for the double-precision numerical operation, and the second mark part operation means 460 comprises a second index part operation unit 463 provided with bits sufficient at least for the single-precision numerical operation.

Next, the operation of the unit is explained.

Figure 1:
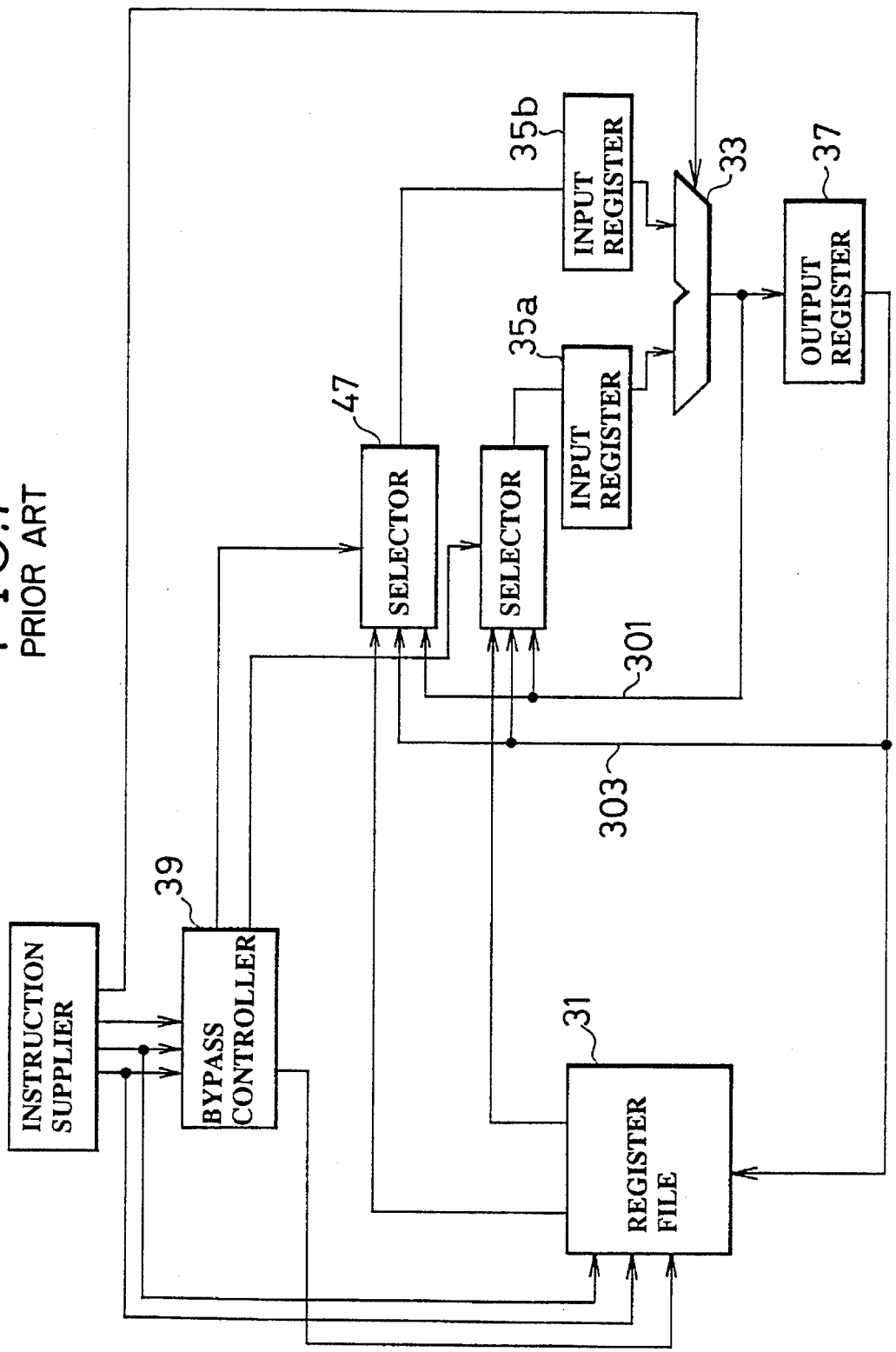
FIG. 1 is a block diagram to show a conventional pipeline information processing circuit.
Figure 2:
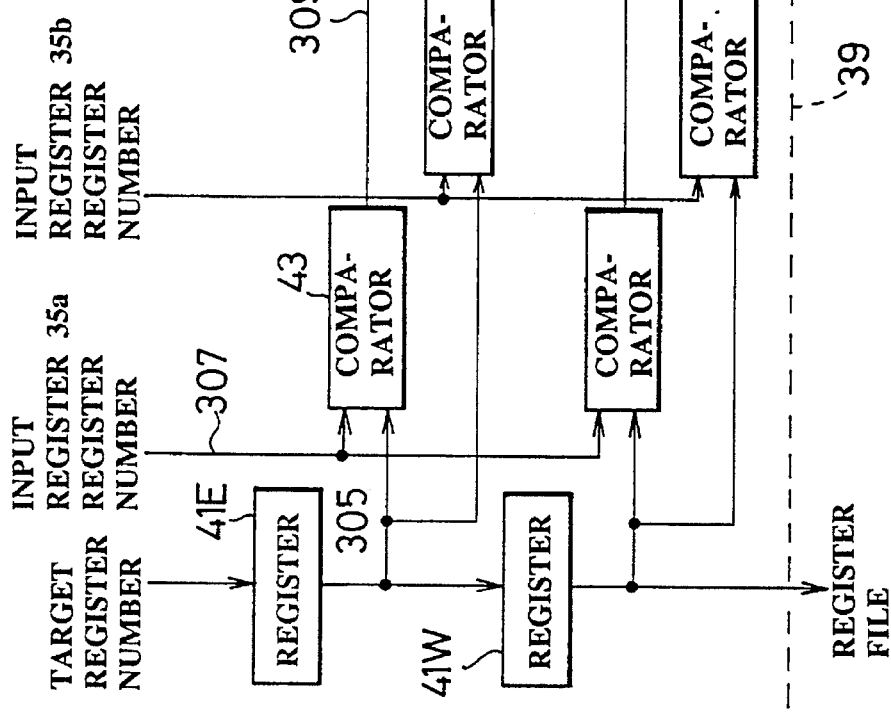
FIG. 2 is a block diagram to show a bypass control section of the information processing circuit shown in FIG. 1.
Figure 3:
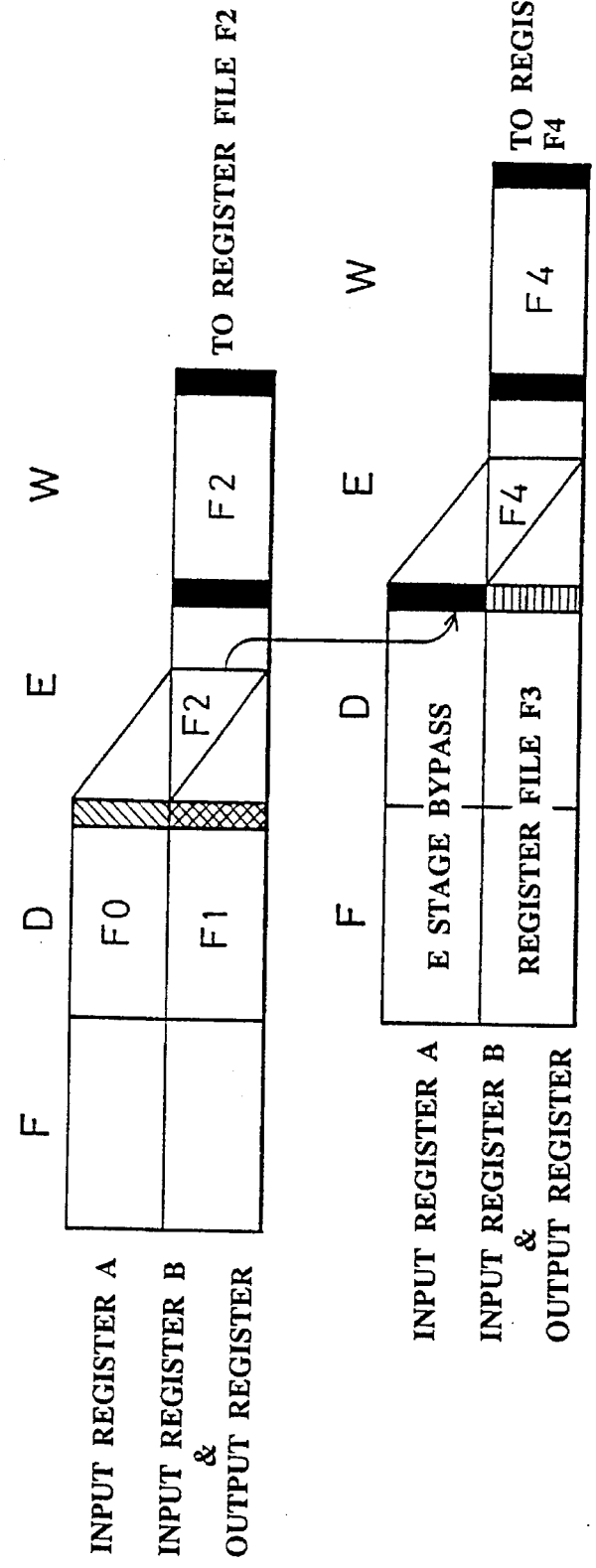
FIG. 3 is a timing chart to show a process by means of the bypass control section shown in FIG. 2.
Figure 4:
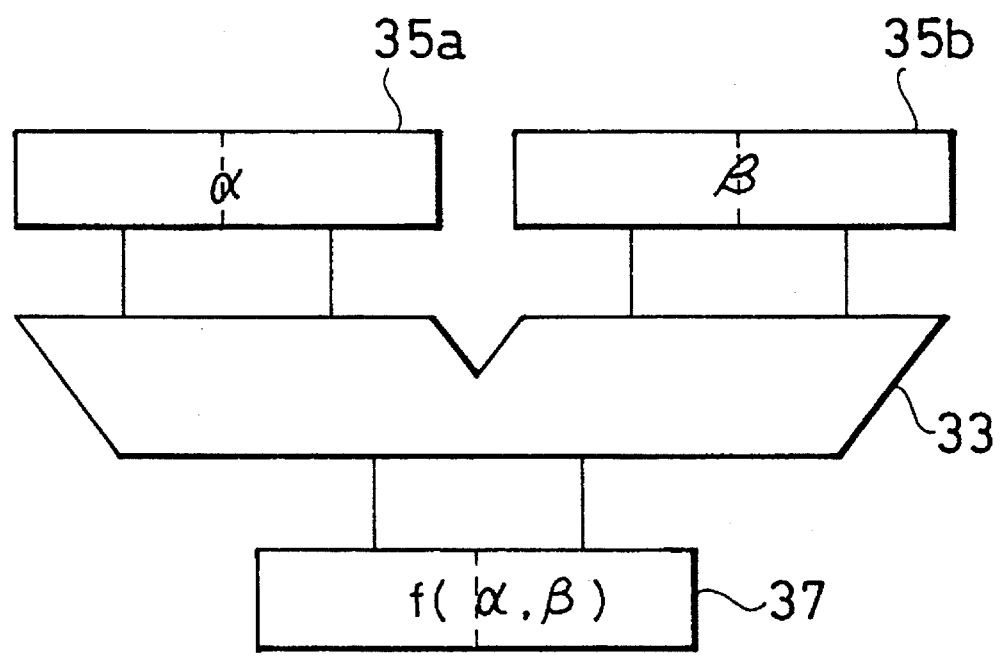
FIG. 4 is a constructional diagram of an arithmetic operation unit which is included in the information processing circuit shown in FIG. 1.
Figure 5A:
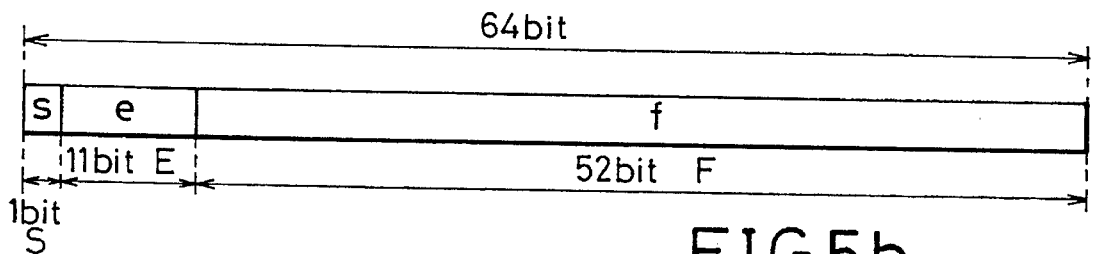
FIGS. 5a and 5b respectively show formats of a double-precision floating point numerical value and a single-precision floating point numerical value based on the standard of IEEE 754.

First, a first operation mode in which the double-precision numerical operation is carried out is described. In this case, a double-precision numerical data as shown in FIG. 5a is inputted to the unit shown in FIG. 10. The mantissa part of the data is inputted and processed in the mantissa part operation means 401 comprising connecting the first and the second field. While, the index part is processed in the first index part operation means 402 for the double-precision or single-precision operation. Moreover, the mark part Is processed in the first mark part operation means 459 for the double-precision or single-precision operation.

Figure 5B:
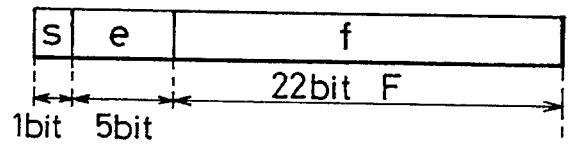

Next, a second operation mode in which the single-precision numerical operation is carried out is explained. In this case, a single-precision numerical data as shown in FIG. 5b is inputted to the unit shown in FIG. 10. The mantissa part of the data is inputted to the mantissa part operation means 401 which is divided into the first and the second field, then processed either in the first or in the second field. While, the index part is processed either by the first index part operation means 402 used for the double-precision or the single-precision operation or by the second index operation means 403 exclusively used for the single-precision operation. Moreover, the mark part is processed either by the first mark part operation means 459 for the double-precision or the single-precision operation or by the second mark part operation means 460 exclusively used for the single-precision operation.

Figure 5C:
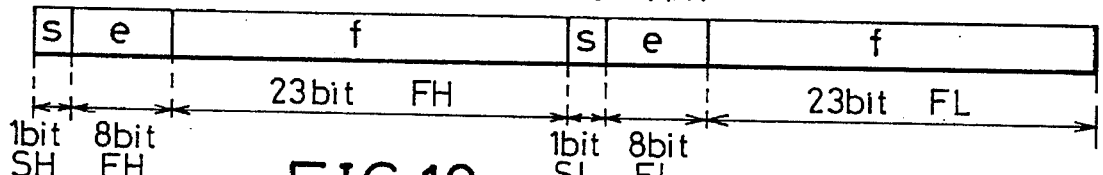
FIG. 5c shows a format of a single-precision numerical value.

Finally, a third operation mode in which two different single-precision numerical operations are carried out at a time is explained. In this case, two different sets of single-precision numerical data as shown in FIG. 5c are inputted to the operation unit shown in FIG. 10. The mantissa parts of these data are respectively inputted to the mantissa part operation means 401 which is divided into the first and the second field, and the first set of the single-precision numerical data is processed in the first field, and the second set is processed in the second field. While, the index parts are respectively processed by the first index part operation means 402 for the double-precision or the single-precision operation and the second index part operation means 403 only for the single-precision operation. Moreover, the mark parts are respectively processed in the first mark part operation unit 459 for the double-precision or single-precision operation and the second mark part operation means only for the single-precision operation.

Accordingly, in the third operation mode, since it is possible to process such different two sets of single-precision numerical data in parallel, as compared with the conventional units, the operation speed in the single-precision numerical operation becomes substantially twice. Incidentally, the hardware to be added to realize this function is only the second mark part operation means 460 only for the single-precision numerical operation which requires a small number of bits, the second index operation means 403 and a small amount of hardware for dividing the mantissa part operation means into the first and the second field.

Generally, in the mantissa part operation means 401, (1) a digit adjusting process of the mantissa part, (2) a real addition or subtraction process of the mantissa part, (3) a discarding or raising process and (4) a normalization process are carried out. However, the construction of the mantissa part operation means varies variously with the respective construction or processing procedure in each process means.

Figure 10:
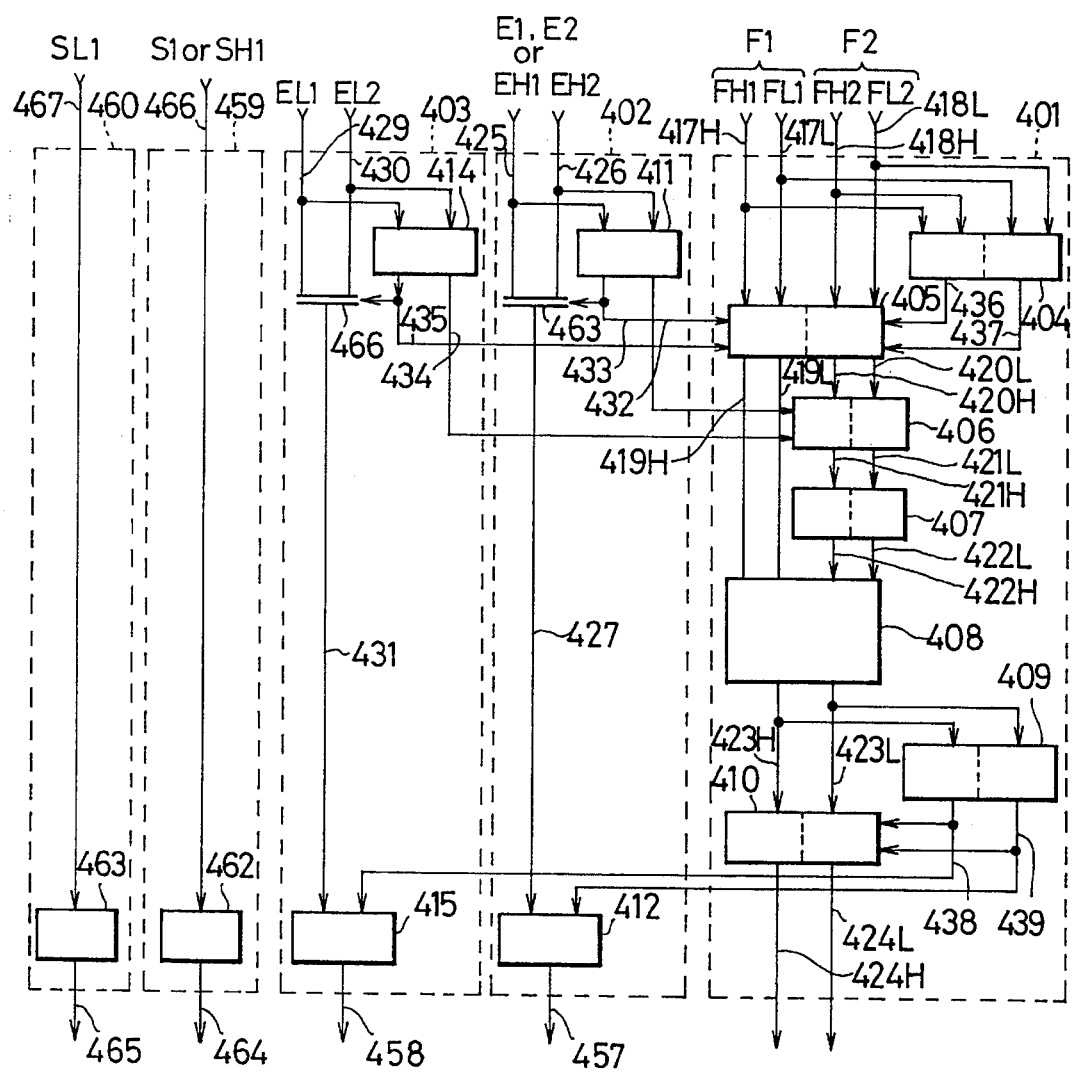
FIG. 10 is a block diagram to show an embodiment of a floating point numerical operation unit according to the present invention.

Next, the construction of each essential element of the floating point numerical operation unit shown in FIG. 10 is explained with reference to FIG. 11 and the following drawings.

Figure 11:
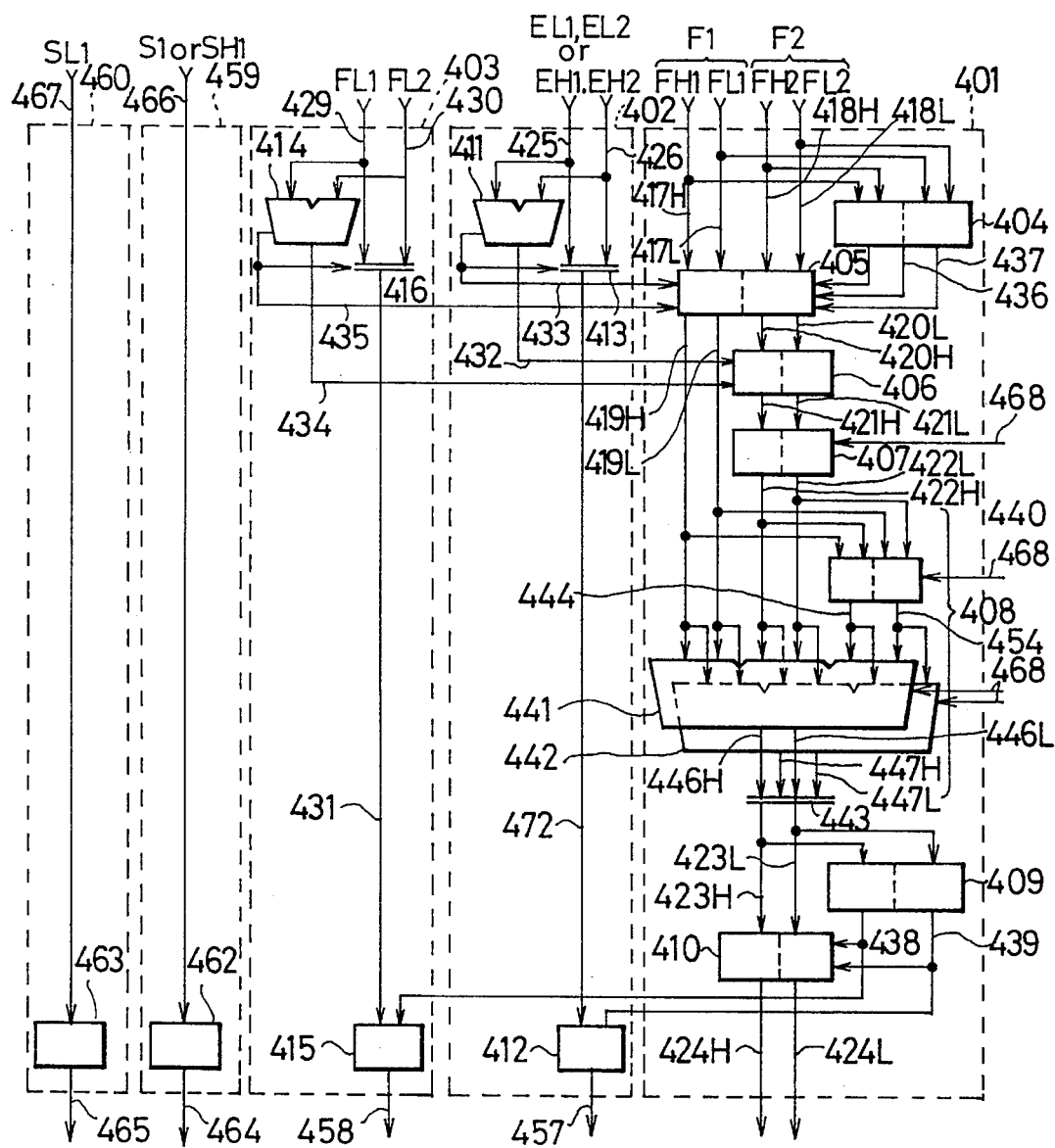
FIG. 11 is a block diagram to explain respective block sections in the operation unit shown in FIG. 10.

In the arithmetic operation with the unit shown in FIG. 11, the index part, the mantissa part and the mark of the mantissa part of a floating point numerical value can be respectively processed in different circuit parts. Incidentally, FIG. 11 shows the mantissa part operation means 401, the index part operation means 402, 403 and the mark part operation means 459, 460. Moreover, this embodiment is constructed based on the standard of IEEE 754.

In such construction, the mantissa part operation means 401 is so constructed as to judge existence of increment by the discarding or raising process before the real addition or subtraction process, and to carry out both of the discarding or raising process and the real addition or subtraction process at the same time.

To the unit are inputted a first operand expressed by marked absolute values (mantissa part: F1, index part: E1, mark of the mantissa part: S1), a second operand (mantissa part: F2, index part: E2, mark of the mantissa part: S2), a control signal 468 for showing whether the real addition or subtraction is to be carried out, a discarding or raising mode signal 469 for showing the discarding or raising mode and a signal for showing the operation mode.

Figure 12A:
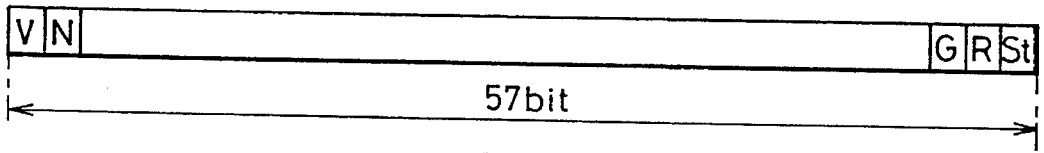
FIGS. 12a, b and c is a diagrams to show formats of a mantissa part.
Figure 12B:
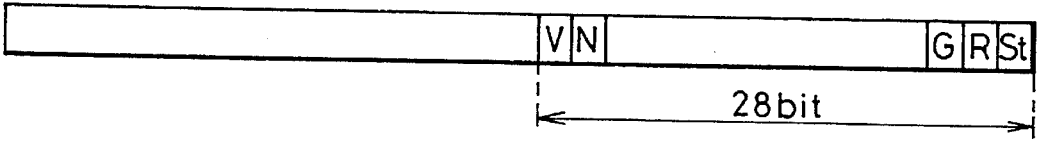

A format of the mantissa part is shown in FIGS. 12a, b and c As shown in the same drawings, the mantissa part is extended with a digit overflow bit V, a hidden bit N of the integer part, a guard bit for showing a value lower by 1 bit than the minimum significant digit, a discarding or raising bit R for showing a value lower by 1 bit than G, and a stick bit St for showing a logical sum of all bits lower than R.

The addition or subtraction signal 468 means a signal for showing which of the real addition or subtraction is to be carried out, and is an exclusive OR between two marks of the mantissa part (+:0, −:1) and the operation modes (addition: 0, subtraction: 1). The discarding or raising mode signal 469 means a signal for showing discarding or raising process modes. FIG. 13 shows an example of a procedure of the discarding or raising mode. Moreover, the operation mode signal 461 means a signal for showing the respective operation modes, that is, the double-precision operation mode, single-precision operation mode and the single-precision-double-speed operation mode. Incidentally, the signal 461 shows 1 in case of the single-precision or single-precision-double-speed mode, and 0 in case of the double-precision mode.

Returning to FIG. 11, index part comparing circuits 411, 414 respectively subtract index parts EH2, EL2 in the second operand from index parts EH1, EL1 in the first operand, so as to obtain respective index-part-largeness-comparison signals 433, 435 and index-part-difference signals 432, 434. In this case, the index part comparing circuit 411 is used for the single-precision or double precision operation, thus, in case of the double-precision operation, the index parts are compared in the index part comparing circuit 411. While, the other index part comparing circuit 414 is used exclusively for the single-precision operation, thus, in case of the single-precision-double-speed operation, the operation is completed by two independent processes by means of both comparators 411, 414. Moreover, by an index part selector 413, a larger index part 427 is selected in accordance with the index-part-largeness-comparison signal 433. While, by another index part selector 416, a larger index part 431 is selected in accordance with the index-part-largeness-comparison signal 435.

Figure 14A:
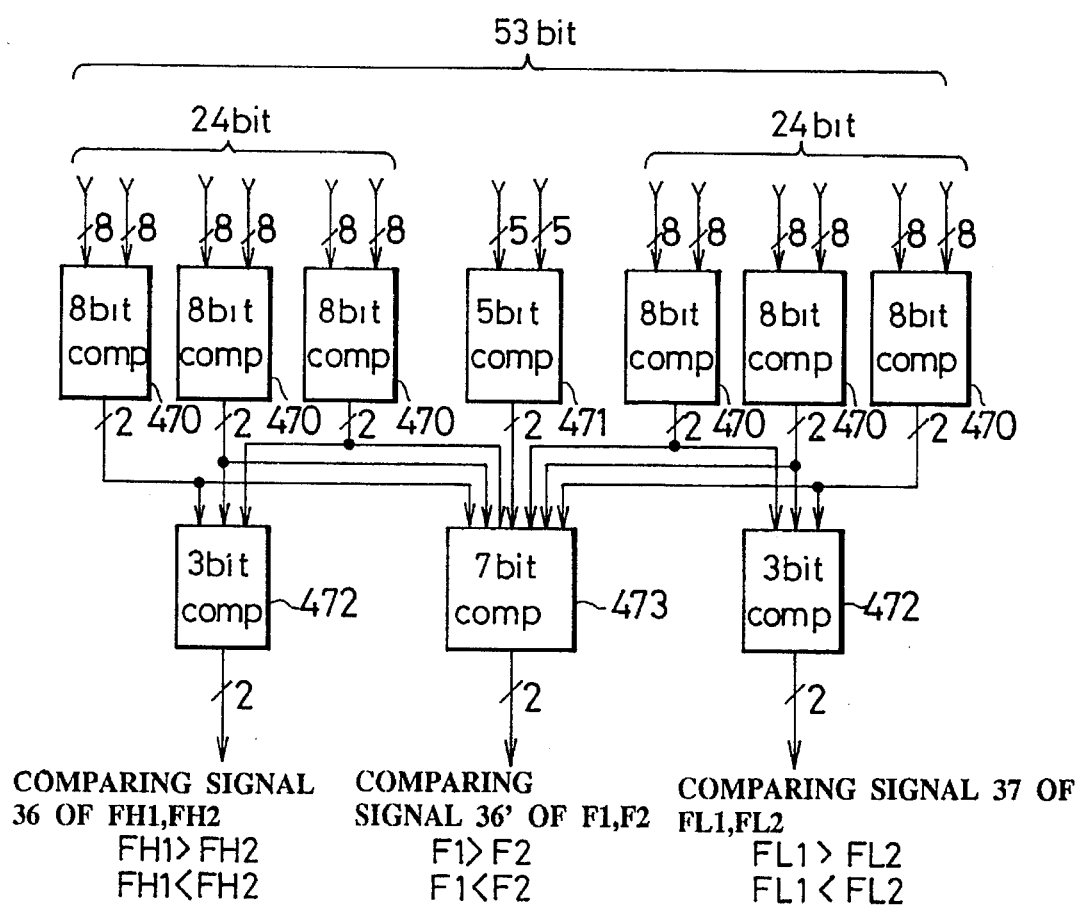
FIGS. 14a, b to 16 and FIGS. 18a,b,c to 21a,b respectively show constructional elements included in the operation unit shown in FIG. 11.
Figure 14B:
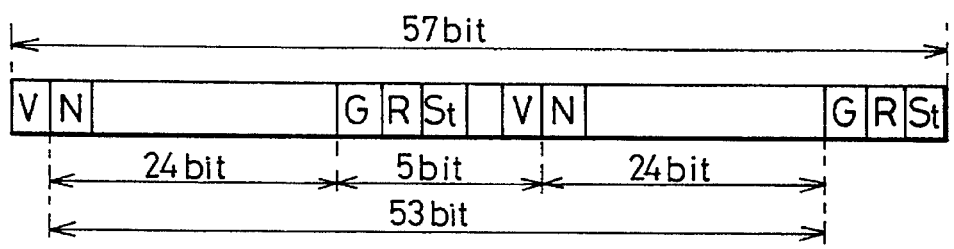

While, a mantissa part comparing circuit 404 compares the mantissa part F1 of the first operand with the mantissa part F2 of the second operand, so as to obtain mantissa-part-largeness-comparison signals 436, 436', 437. FIG. 14a shows the mantissa part comparator 404 in detail, and FIG. 14b shows the input format of data. As shown in FIG. 14a, this circuit has a two- stage structure. The first stage comprises six 8-bit comparators 470 and one 5-bit comparator 471. Each of these comparators outputs a 2-bit signal for showing a largeness comparison result (for example, A>B or B>A with respect to input data A and B) between respective fields in the 8-bit or 5-bit unit. On the other hand, the second stage comprises two 3-bit comparators 472 and one 7-bit comparator 473.

The 7-bit comparator 473 compares largeness of the mantissa portion of each double-precision numeral value over all of the output from the first stage, and outputs the comparison signal 436'. While, the two 3-bit comparators respectively compare largeness of the mantissa portions FH1, FH2 and FL1, FL2 of the single-precision numerical values respectively inputted to the first and the second field, and output the comparison signals 436, 437.

While, a mantissa part exchanging circuit 405 compares largeness of the first and the second operand in accordance with the index-part-largeness-comparison signals 433, 435 and the mantissa-part-largeness-comparison signals 436, 436', 437, the mantissa part of the operand whose absolute value is larger than that of the other is outputted as mantissa parts 419H, 419L, while the mantissa part of the other operand of the smaller absolute value is outputted as mantissa 420H, 420L. Namely, the logic of the largeness comparison is defined as follows:

(1) When the largeness of the index parts is different, the operand having the larger index part is defined as operands 419H, 419L.

(2) When the largeness of the index parts is equal, the operand having the larger mantissa part is defined as operands 419H, 419L.

FIG. 15 shows the mantissa part exchanging circuit 405 in detail. As shown in the same drawing, the mantissa part exchanging circuit 405 comprises a selector 474 and a selector control circuit 475. Each of these selectors is divided into a first field and a second field, and it is possible to exchange the first fields or the seconds fields. The selector control circuit 475 outputs exchange control signals 455, 456 in accordance with the operation mode signal 461, the index-part-largeness-comparison signals 433, 435, and the mantissa-part-largeness-comparison signals 436, 436', 437. In such construction, in case of the double-precision operation, the first fields and the second fields are respectively changed at the same time, while in case of the single-precision or single-precision-double-speed operation these fields are independently exchanged.

Figure 16:
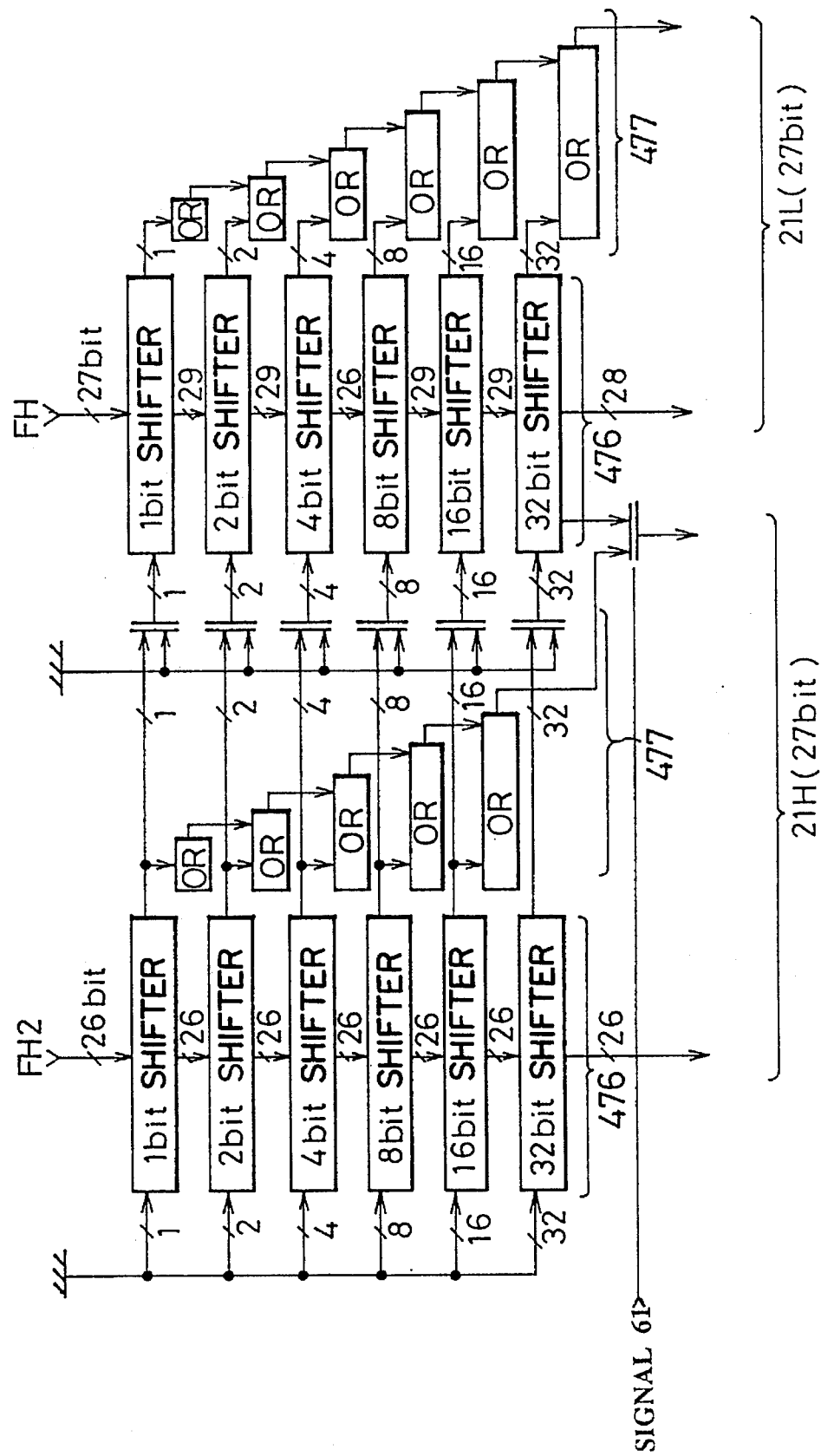

Moreover, the digit adjusting circuit 406 shifts the mantissa parts 420H, 420L by the number of the index-part-difference signal 432 or 434 so as to adjust the digit to that of the mantissa parts 419H, 419L, and the shifted mantissa parts are defined as 421H, 421L anew. Besides, the circuit 406 produces a stick bit. FIG. 16 shows the digit adjusting circuit 406 in detail. As shown in the same drawing, the digit adjusting circuit 406 comprises a right barrel shifter 476 and two stick-bit producing units 477 both of which are dividable into respective first and second fields. In such construction, when the double-precision operation is carried out, the first and the second field are connected to each other, and a bit row shifted out from the first field is shifted into an MSB of the second field. While, 0 is shifted in an MSB of the first field. The stick bit is obtained as a logical sum of a bit row shifted out from the shifter of second field. On the other hand, when the single-precision or the single-precision-double-speed operation is carried out, these first and second fields are divided in accordance with the operation mode signal 461. In this case, 0 is shifted in both of MSB of the first and the second field. While, the stick bit is obtained as a logical sum of bit rows shifted out from the respective first and second fields.

The inversion circuit 407 is a circuit for producing bit inversion with respect to the mantissa parts 421H, 421L on the real subtraction operation, and comprises an exclusive OR array which divided into two parts so as to carry out independent inversion control to the first and the second field.

Figure 18B:
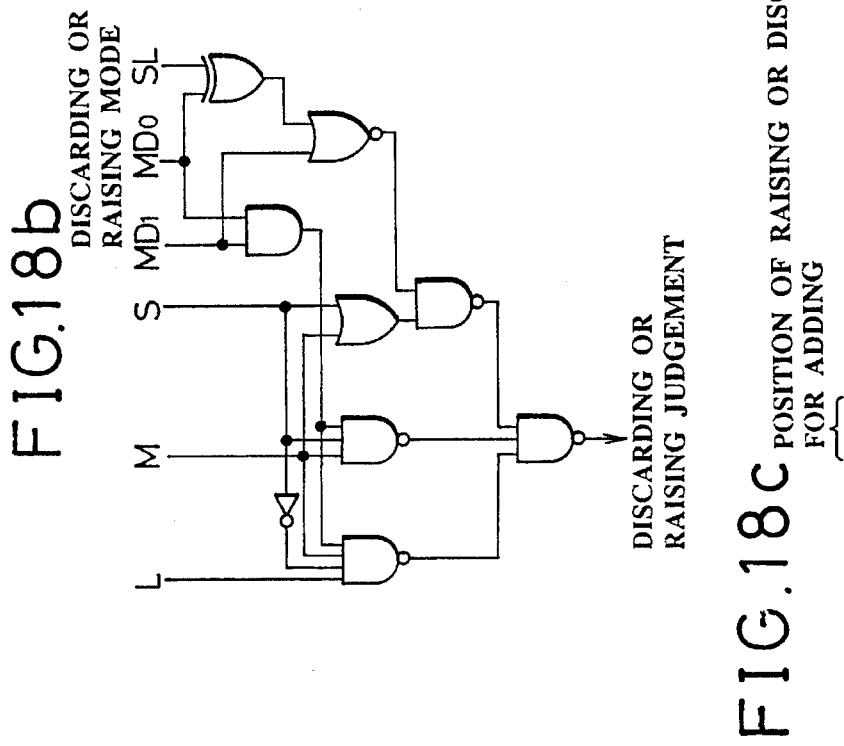
Figure 18C:
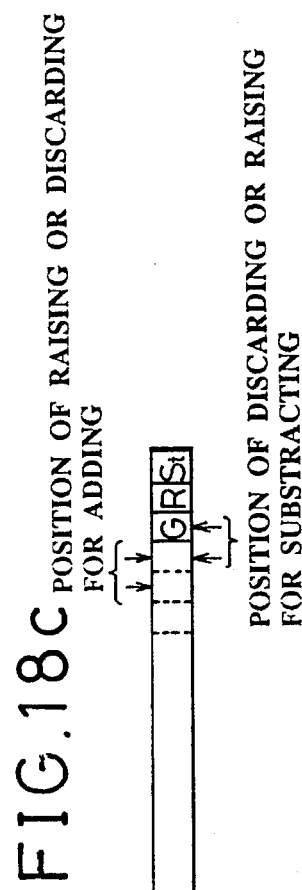

Moreover, a discarding or raising circuit 440 carries out first discarding or raising judgement on whether or not the increment by means of discarding or raising is necessary on the assumption that the normalizaiton after operation is not necessary, and second discarding or raising judgement on whether or not the increment by means of discarding or raising is necessary on the assumption that the normalization is necessary, in accordance with a value of a specific portion of each mantissa part, the addition-subtraction control signal 468, the discarding or raising mode signal 469, the mark of the first operand, and the exchange control signals 455, 456. Moreover, whether the increment by discarding or raising is to be carried out or not is decided by a logical sum of the minimum significant digit value of a normalized mantissa part, a value lower by one bit than the the minimum significant digit value, and another value still lower by one bit. FIG. 17 shows an example of the judgement logic of the increment according to various discarding or raising modes. Though the position to be subjected to the discarding or raising process can not be decided after the operation, the position is selected from only two sites shown in FIG. 18c respectively in the real addition and subtraction operations. Therefore, it is possible to decide solutions corresponding to the respective cases in advance, and to select a suitable one therefrom.

Figure 18A:
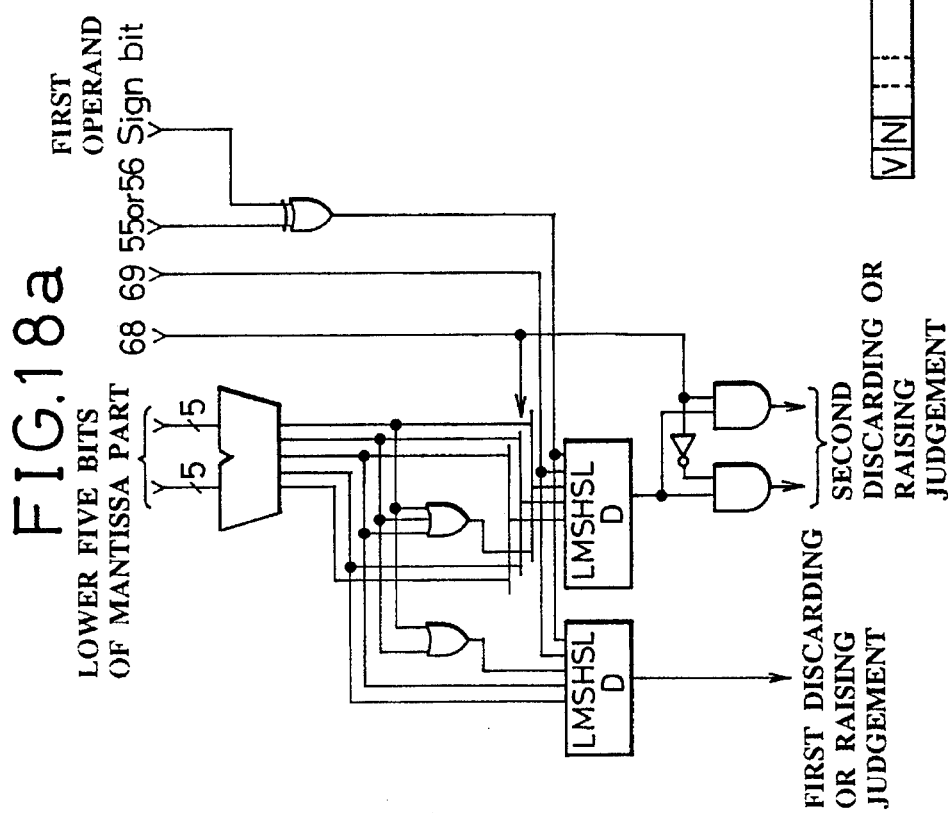

The discarding or raising circuit 440 comprises a circuit as shown in FIG. 18a for carrying out the first and the second discarding or raising judgement. On the double-precision operation, the first and the second discarding or raising judgement are carried out in accordance with the sum of lower five bits of the mantissa part. While on the single-precision or single-precision-double-speed operation, the first and the second discarding or raising judgement to the first field are carried out in accordance with the sum of lower five bits of the first field, and the first and the second discarding or raising judgement to the second field are carried out in accordance with the sum of lower five bits of the second field.

Figure 19:
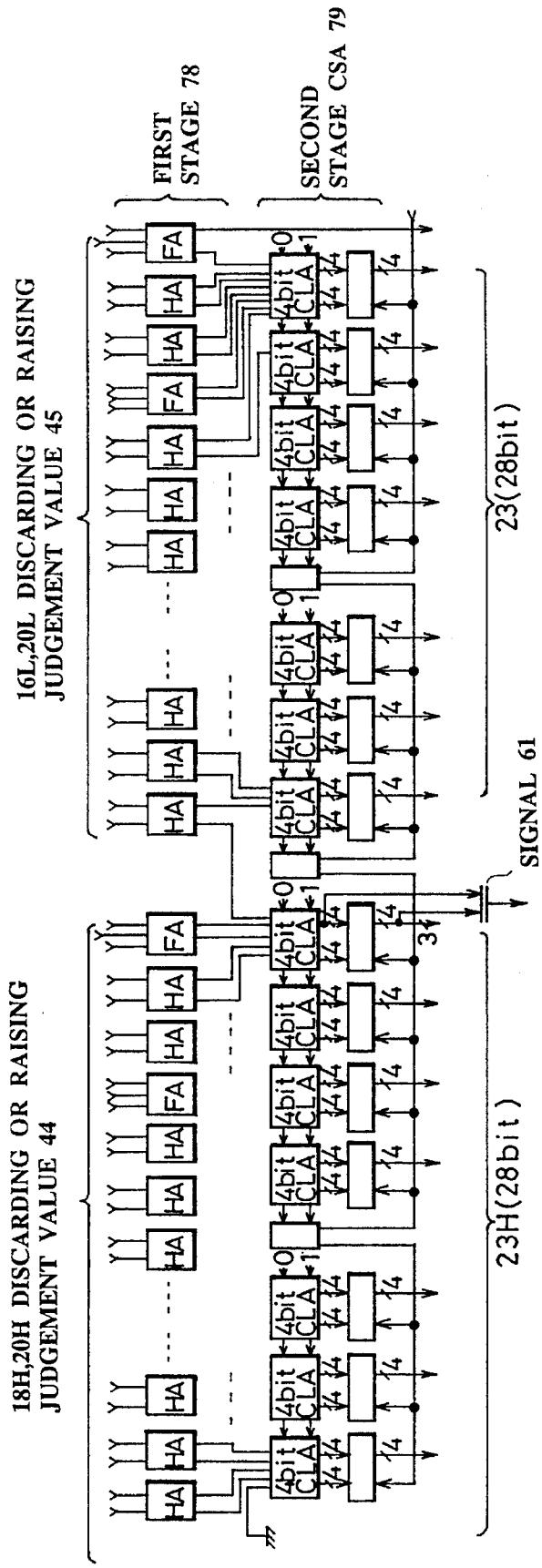

Moreover, a main adder 441 carries out addition or subtraction among the mantissa part F1 of the first operand, the mantissa part F2 of the second operand and the first discarding or raising judgement value, so as to obtain solutions 446H, 446L on assumption that the normalization is not required after the discarding or raising. While, another main adder 442 carries out addition or subtraction among the mantissa part F1 of the first operand, the mantissa part F2 of the second operand and the second discarding or raising judgement value, so as to obtain solutions 447H, 447L on assumption that the normalization is required after the discarding or raising. FIG. 19 shows the main adder 441 in detail. Incidentally, the other main adder 442 has the same construction as that of the main adder 441 except that the addition positions to the discarding or raising signal are different in both adders. Both of the main adders 441, 442 are three-input type adders in which all or a half of an adder array 478 of the first stage composes a CSA (carry saved adder) so as to carry out an addition operation with three input values. While, in the second stage 479, a CLA (carry lookahead adder) is constructed for each 4 bits, and a CSA (carry select adder) is formed for each 12 or 16 bits, so as to carry out the final addition operation at a high speed. Moreover, it is possible to divide the main adders 441, 442 respectively into the first and the second field in accordance with the operation mode signal 461. Incidentally, both of these fields are connected to each other on the double-precision operation, while divided on the single-precision or single-precision-double-speed operation.

Furthermore, a solution selecting circuit 443 is used for selecting a correct solution in the two solutions obtained by the two main adders. The selecting circuit 443 can be controlled independently to the first and the second field. Moreover, in case of the double-precision operation, the first and the second fields are selected together.

The logic of the selection is defined as follows:

(1) In case of the addition operation, when the overflow bit V of the solution of the first adder is 1, the solution of the second adder is selected, while when 0, the solution of the first adder is selected.

(2) In case of the subtraction operation, when the hidden bit N of the solution of the first adder is 1, the solution of the first adder is selected, while when 0, the solution of the second adder is selected.

Figure 20A:
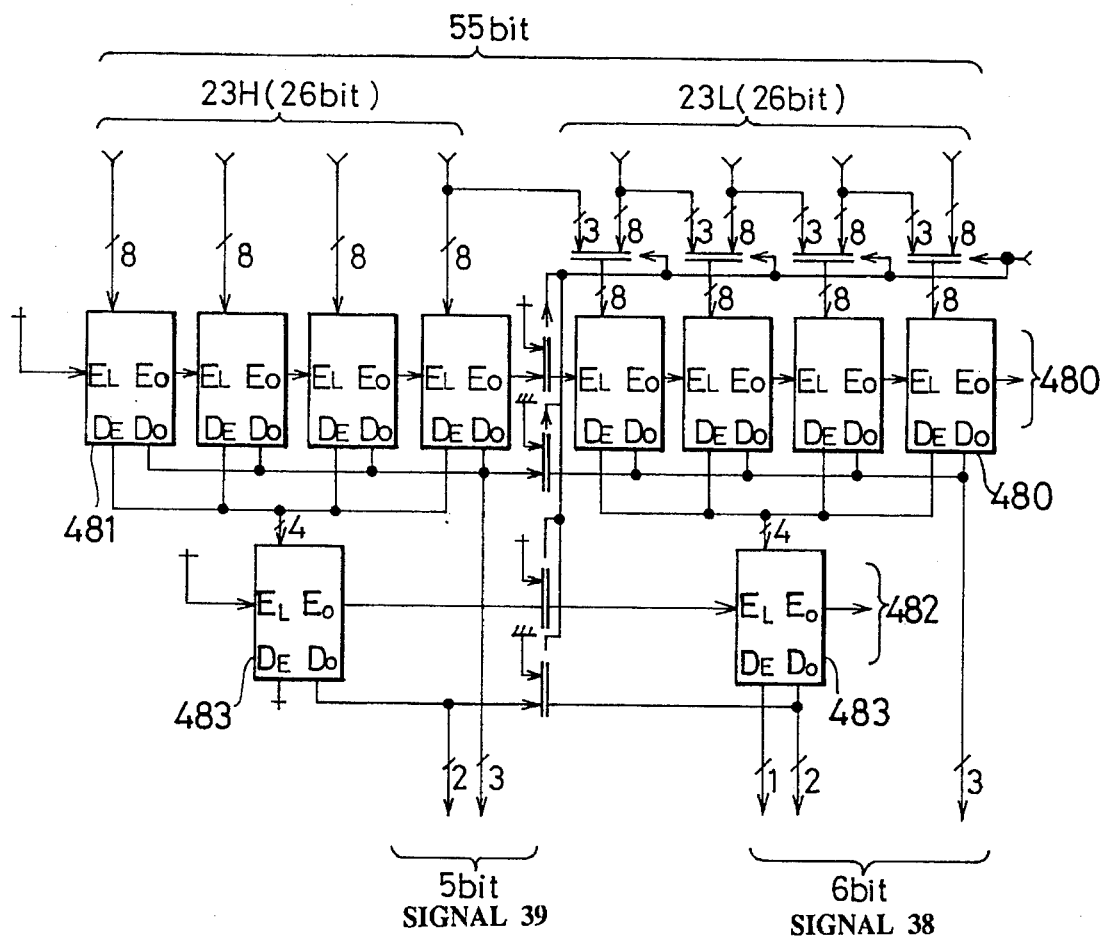
Figure 20B:
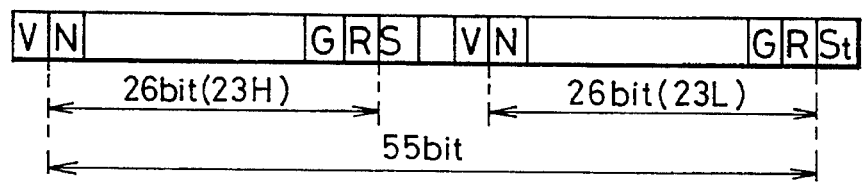

Moreover, the priority encoder 409 outputs step numbers 438, 439 for shifting on the nomalization process. FIG. 20a shows the priority encoder 409 in detail. As shown in the same drawing, the encoder 409 has a two-stage structure. The first stage 480 comprises eight 8-bit priority encoders 481 from each of which an encode result comprising 3 bits is outputted for each 8 bits. While, the second stage 482 comprises two 4-bit priority encoders 483 from each of which a priority encode result of 2 bits is outputted for each 4 bits. Moreover, the priority encoder 409 can be divided in accordance with the operation mode signal 461. In case of the double-precision operation, as shown in FIG. 20b, a mantissa part 23 (corresponding to 55 bits except for the V and St bits) is inputted, so as to output an encode result comprising 6 bits. While, in case of the single-precision or single-precision-double-speed operation, this encoder 409 is divided, and as shown in FIG. 20b, two mantissa parts 23H, 23L (each corresponding to 26 bits except for the V and St bits) of two single-precision numerical values are inputted. Moreover, as shown in FIG. 20a, in the second field, the inputted mantissa part 23L is shifted by 3 bits, so that encode results 438, 439 of 5 bits are respectively outputted.

Figure 21A:
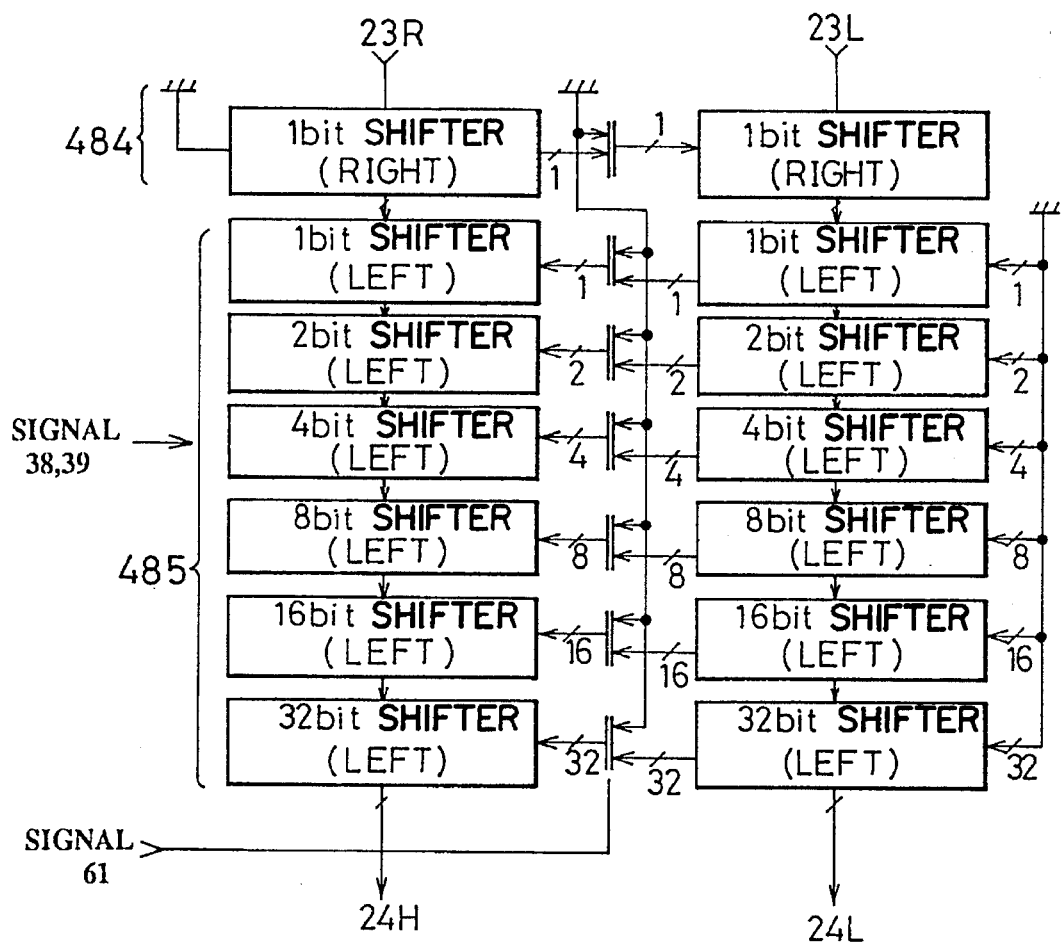
Figure 21B:
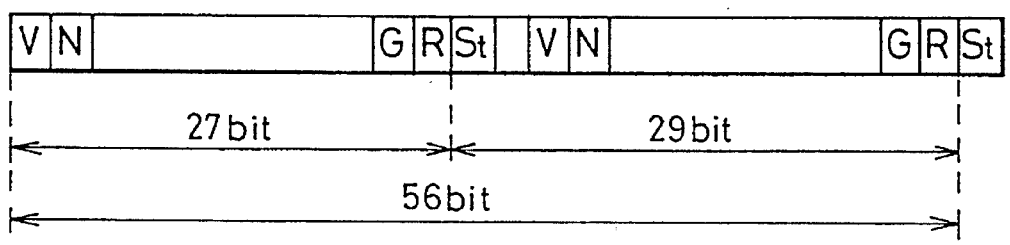

The normalization circuit 410 is a circuit for normalizing the operation results 23H, 23L so that the hidden bit N becomes 1. FIG. 21a shows the normalization circuit 410 in detail, and FIG. 21b illustrates the output of the normalization circuit 410 of FIG. 21a. As shown in the same drawing, the normalization circuit 410 comprises a right shifter 484 and a left shifter 485. Moreover, the normalization circuit 410 can be divided into two parts in accordance with the operation mode signal 61. Besides, in case of the double-precision operation, these two parts are connected to each other, and when the V bit is 1, a one-bit right shifting operation is carried out, while when 0, a left shifting operation is carried out by the number of bits corresponding to the shift signal 38. While, in case of the single-precision or single-precision-double-speed operation, the circuit 410 is divided into a first and a second field, moreover, the one-bit right shifting operation or the left shifting operation by the number of bits corresponding to the shift signal 38 or 39 is carried out in accordance with the value of V in the respective fields. In either case, 0 is shifted in the LSB.

On the other hand, the index operation units 412, 415 are respectively used for adjusting the index part by the number of bits shifted in the above-mentioned normalization operation. Moreover, the index part operation unit 412 is used for the single-precision or double-precision operation, and in case of the double-precision operation, an index part 457 is calculated by the index part operation unit 412. Namely, when the one-bit right shifting operation is carried out in the normalization, the increment operation is carried out, while when the n-bit-left shifting operation is carried out, n is subtracted from the index numerical value 427. While, in case of the single-precision or the single-precision-double-speed operation, index parts 457, 458 of the respective first and second fields are similarly calculated by the index operation units 412, 415.

Moreover, the mark part operation units 462, 463 are respectively used for obtaining marks 464, 465 of solutions in accordance with the mark part S1 in the first operand. The logic of the mark obtaining process is defined as follows:

(1) In case of the real addition:
the mark of solution is equal to S1.
(2) In case of the real subtraction:
when the solution is not 0 and the exchange of the mantissa part is not carried out, the mark is S1;
when the solution is not 0 and the exchange of the mantissa part is carried out, the mark is inverted S1;
when the solution is 0 and the discarding or raising mode is carried out in the negative direction, the mark is negative; and
when the solution is 0 and the discharging or raising mode is carried out in other directions than the negative direction, the mark is positive.

Next, the operation of the embodiment shown in FIG. 11 is explained. First, a first operation mode in which the double-precision numerical operation is carried out is described.

In the double-precision numerical operation, the mantissa part operation means 401 is operated in the connected fashion. The index part is processed by the index part operation means 402. Moreover, the mark part is processed by the mark part operation means 459. Moreover, in the arithmetic operation means shown in FIG. 11, the double-precision numerical data shown in FIG. 5a is inputted. Besides, the mantissa parts F1, F2 are respectively inputted in accordance with the format as shown in FIG. 12a. While, the index parts EH1, EH2 are compared with each other by the index part comparator 411, so as to obtain the index difference signal 432. Moreover, the larger index part 427 is selected from the comparison result. The mantissa parts F1, F2 are compared with each other by the mantissa part comarator 404. From the comparison result, the mantissa part of an operand whose absolute value is larger is outputted as the mantissa part 419 from the mantissa part exchanger 5. While, in the digit adjusting circuit 406, the mantissa part 420 of the smaller operand is shifted in the right direction in accordance with the index difference signal 432. At the time, the stick bit is produced in parallel. Moreover, when the real subtraction is carried out, the inversion of the mantissa part 420 is produced by the mantissa part inverter 407. Further, the lower 5 bits of the mantissa part are inputted to the discarding or raising circuit 440, so as to carry out the first or the second discarding or raising judgement based on the sum. Then, these mantissa parts 419, 422 and the discarding or raising judgement value 445 are inputted to the main adders 441, 442 respectively, and the first operation result 446 on condition that the normalization is not required and the second operation result 447 on condition that the normalization is required are calculated respectively. Thereafter, the solution selecting circuit 420 selects the correct solution 423 based on the values of V and N bits of the first operation result 446. Then, the selected solution 423 is inputted to the priority encoder 409 so as to obtain the shift number 438 necessary for the normalization. Moreover, the selected solution is normalized by the normalization circuit 410 by the shift number 438. While, the shift number 438 is inputted to the index part operation unit 412 to calculate the index part 457 of the solution. Besides, the mark part is obtained from the mark part S1 of the first operand by the mark part operation unit 462.

Next, a third operation mode in which the single-precision-double-speed operation is carried out is explained.

Incidentally, in case of a second operation mode in which the single-precision operation is carried out is substantially the same as the third operation mode except that the number of data to be processed at the time is different, thus the explanation of this case is omitted here. Namely, in case of the single-precision-double-speed operation or the single-precision operation mode, the mantissa part operation means 401 is divided in the two fields. In this case, the index part is processed by the index part operation means 402 and 403 respectively. While, the mark part is processed by the mark part operation means 459 and 460 respectively.

Figure 12C:
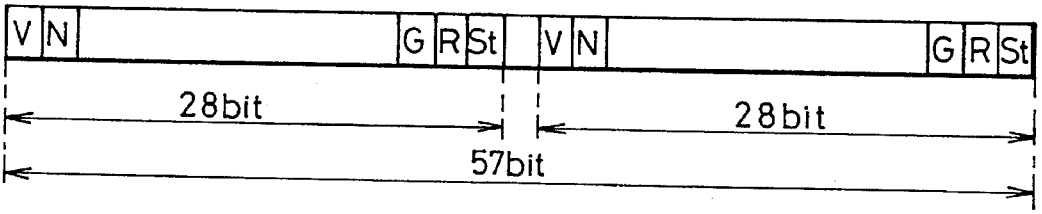
Figure 6:
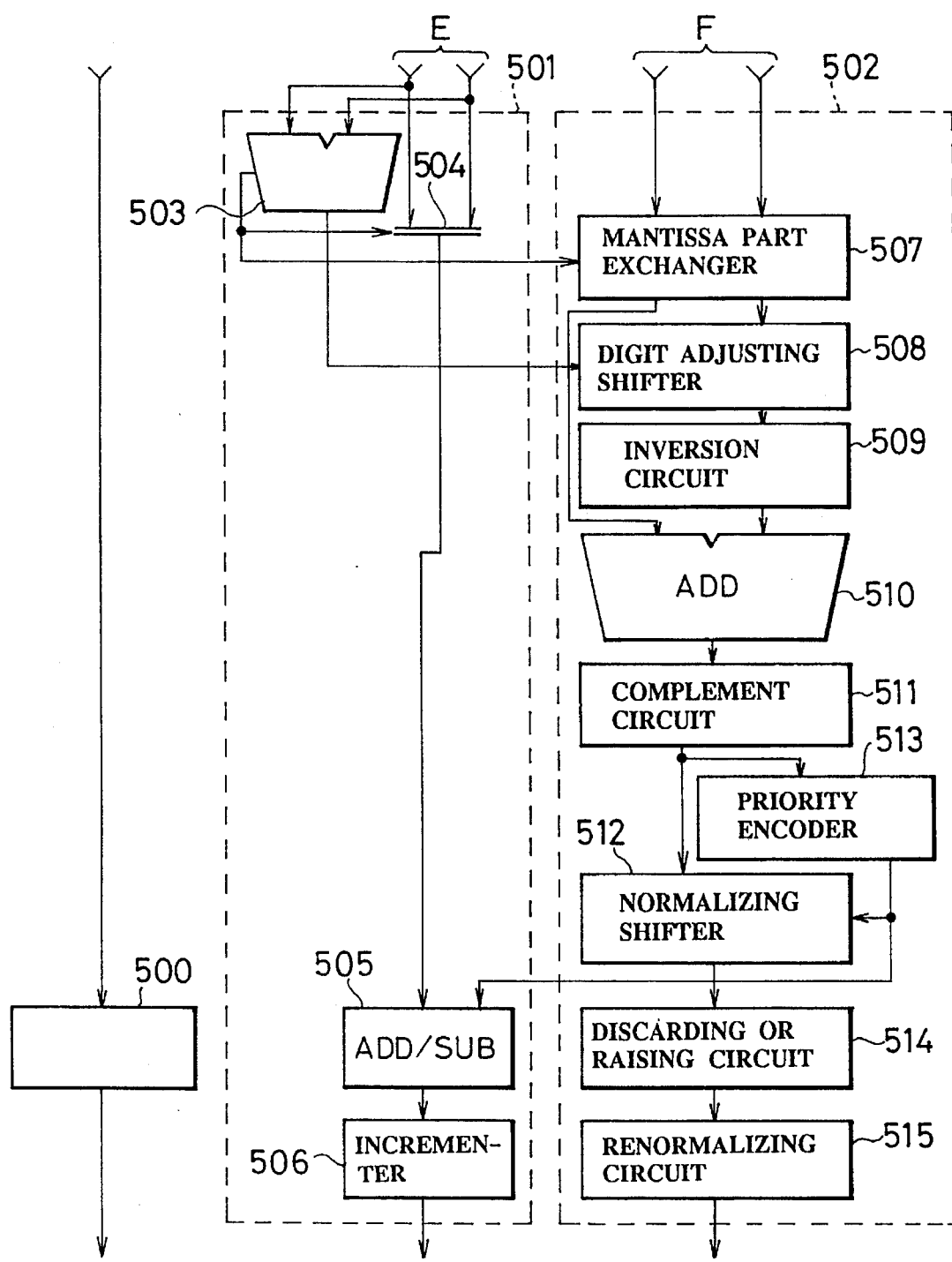
FIG. 6 is a block diagram to show construction of a conventional floating point numerical operation unit.

Moreover, in the arithmetic operation unit shown in FIG. 11, the single-precision numerical data as shown in FIG. 5c is inputted. In this case, with respect to the mantissa part, two sets of data are respectively inputted to the first and the second field of the mantissa part operation means based on the format as shown in FIG. 12c. First, the first set of index parts EH1, EH2 are compared with each other by the index part comparator 411 to obtain the index difference signal 432. Moreover, from the comparison result, the larger index part 427 is selected. Then, the mantissa parts FH1, FH2 are compared with each other by the mantissa part comparator 404. As the result, the mantissa part of the operand whose absolute value is larger than the other is outputted as the mantissa part 419 from the mantissa part exchanger 405 in accordance with the index- part-largeness-comparison signal 433 and the mantissa part comparison signal 436. Likewise, the second set of index parts EL1, EL2 are compared with each other by the index part comparator 414 to obtain the index difference signal 434. Then, from the comparison result, the larger index part 431 is selected. While, the mantissa parts FL1, FL2 are compared with each other by the mantissa part comparator 404. Then, the mantissa part of the operand whose absolute value is larger than the other is outputted as the mantissa Dart 419L from the mantissa part exchanger 405 in accordance with the index-part-largeness-comparison signal 435 and the mantissa part comparison signal 437. Moreover, the digit adjusting circuit 406 shifts the mantissa parts 420H, 420L in the right direction in accordance with the index difference signal 432, 434. At the time, the stick bit of each field is produced. While, in case of the real subtraction operation, the inversion values to the mantissa parts 421H, 421L are taken. Then, the mantissa parts are inputted to the discarding or raising circuit 440, and the first and the second discarding or raising judgement signals 444 with respect to the first set of operands are obtained based on the sum of respective lower 5 bits of the mantissa parts 419H, 422H. Likewise, the other first and the second discarding or raising judgement signals 445 with respect to the second set of operands are obtained based on the sum of respective lower 5 bits of the mantissa parts 419L, 422L. Then, these mantissa parts 419H, 422H, 419L, 422L and the discarding or raising judgement signals 444, 445 are respectively inputted to the main adders 441, 442, so that the first operation results 446H, 446L on condition that the normalization is not required in the first and second fields and the second operation results 447H, 447L on condition that the normalization is required in these fields are calculated. The solution selecting circuit 443 selects the correct solution in the first field based on the V and N bit values of the operation result 446H. Likewise, the same circuit 443 selects the correct solution in the second field based on the V and N bit values of the operation result 446L. Then, the selected solutions 423H, 423L are inputted to the priority encoder 409 so as to obtain the shift numbers 439, 438 necessary for the normalization. Moreover, the selected solutions 423H, 423L are respectively shifted by the shift numbers 439, 438 by the normalization circuit 410 for the normalization. Moreover, the shift numbers 439, 438 are inputted to the index part operation units 412, 415 to calculate the respective index parts of the solutions. Besides, the mark parts are respectively obtained by the mark part operation units 462, 463 in accordance with the mark parts SH1, SH2 of the first operand.

In such a manner, by dividing the mantissa part operation means 401 into the first and the second field so that these two fields can be operated independently, two sets of different single-precision numerical data can be processed at the same time.

Figure 22:
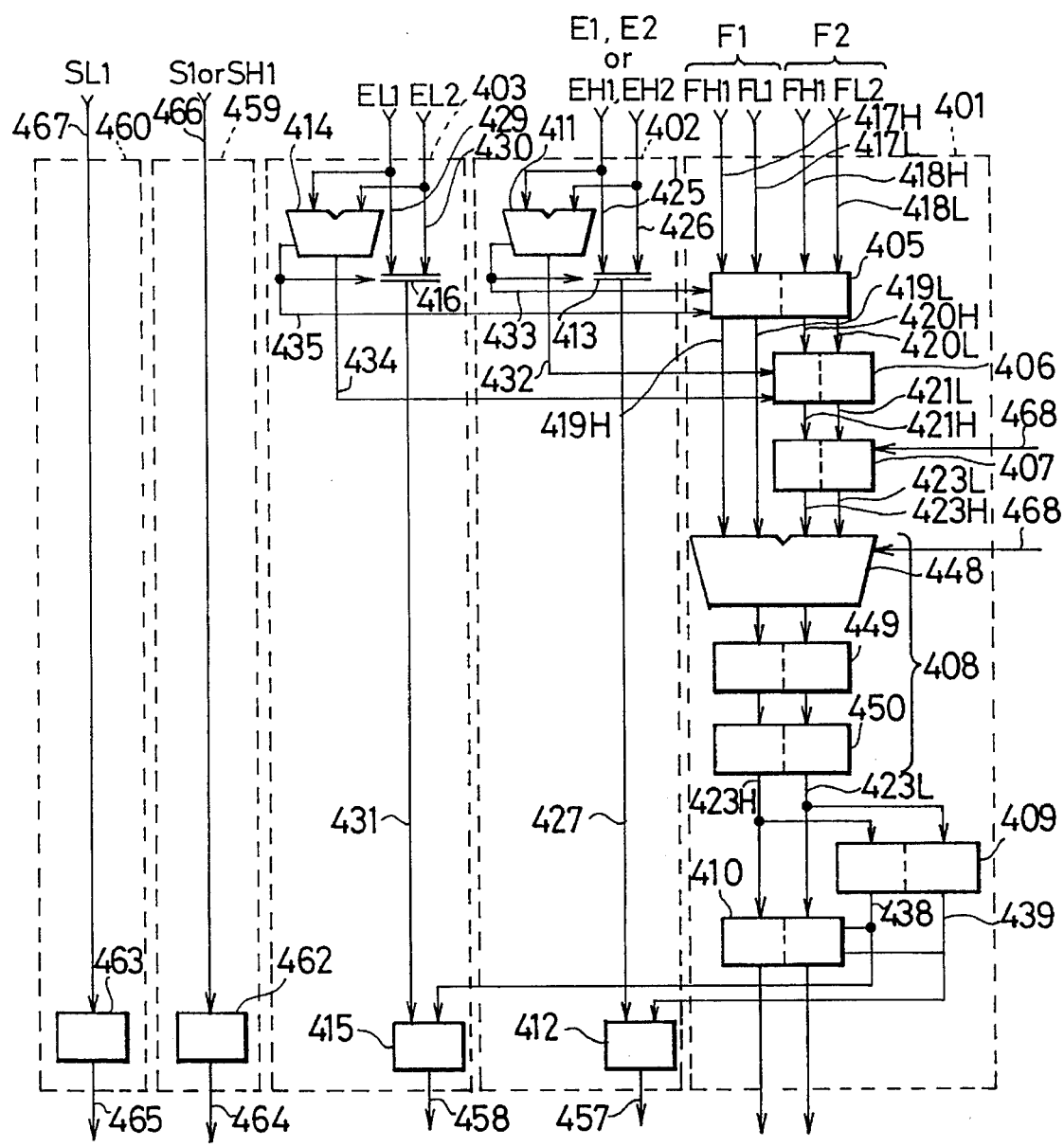
FIGS. 22 and 23 are block diagrams to respectively show another embodiment of a floating point numeral operation unit according to the present invention.

FIG. 22 shows a block diagram of another embodiment of the floating point numerical operation unit according to the present invention. In this embodiment, the construction of the mantissa part operation means 401' is different from that in the previous embodiment in that the discarding or raising process and the complement process after the arithmetic operation are carried out in the same circuit based on the principle that these two kinds of processes are never required at the same time.

Next, the foating point numerical operation according to this embodiment is explained. In the explanation, the same reference numerals or the same reference characters respectively designate the same parts as those described in the previous embodiment.

First, the mantissa parts F1, F2 are exchanged by the comparison result of the index parts E1, E2. Then, with respect to the mantissa part 420, the digit adjustment is carried out by a digit adjustment circuit. While, in case of the real subtraction operation, the inversion value of the mantissa part 421 is taken. Then the addition is given to the respective mantissa parts 419, 422 by a main adder 448. The reference numeral 449 designages an inverter, and 450 shows an incrementer. Moreover, when the subtraction result becomes negative, the complement process is carried out. Besides, from the operation result, when the increment by discarding or raising is judged to be necessary, the incrementer 450 carries out the increment process. Then, the operation result 423 is normalized by the normalization circuit 410.

Figure 23:
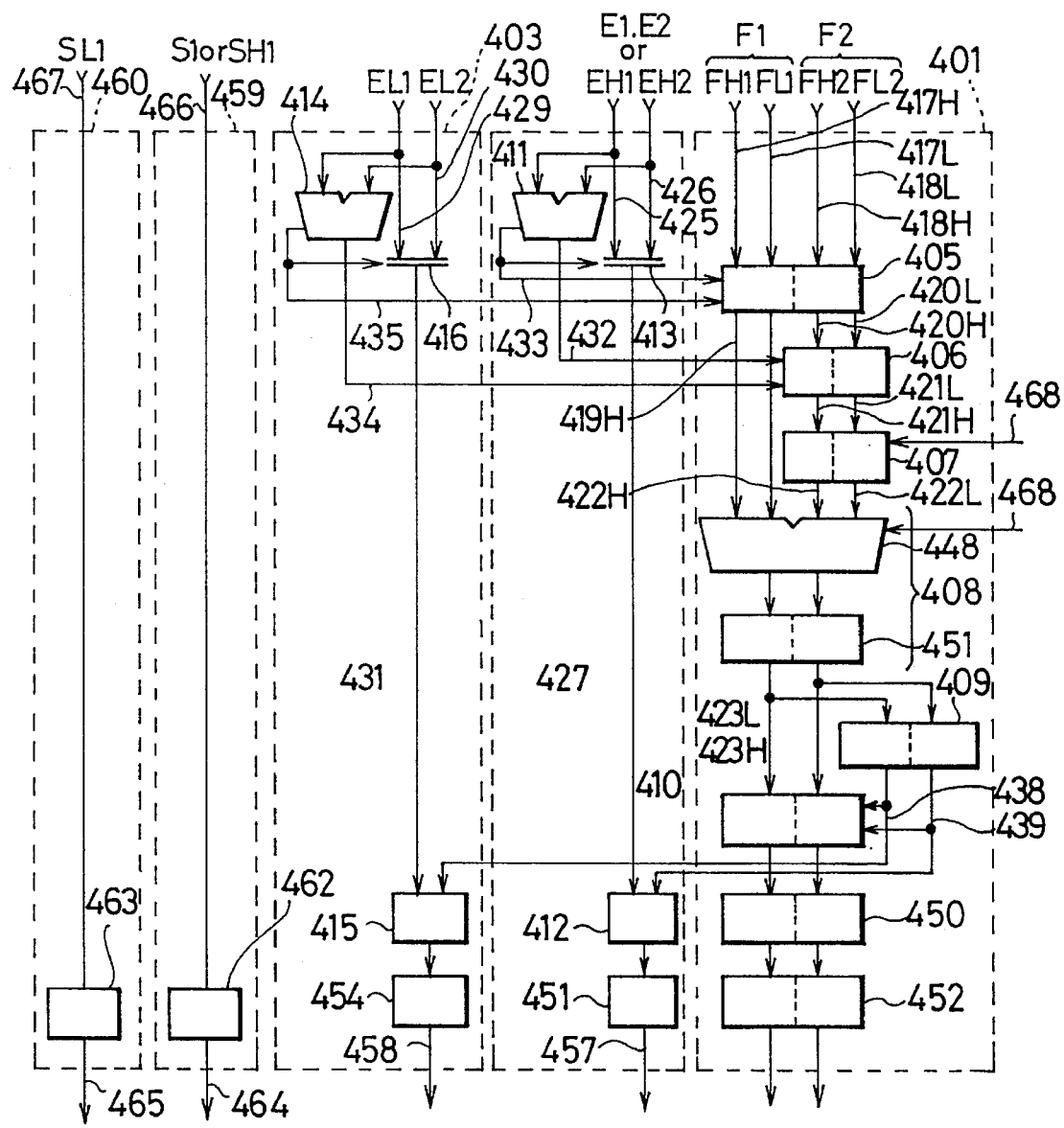

FIG. 23 is a block diagram to show still another embodiment.

In the same drawing, the mantissa part operation means 401" has classical construction and is different from those described in the previous two embodiments.

In this embodiment, the floating point numerical operation is carried out as follows.

First, the mantissa parts F1, F2 are exchanged by the comparison result of the index parts E1, E2. Then, with respect to the mantissa part 420, the digit adjustment is carried out by a digit adjustment circuit. While, in case of the real subtraction operation, the inversion value of the mantissa part 421 is taken. Then the addition is given to the respective mantissa parts 419, 422 by a main adder 448. The reference numeral 451 shows a complement circuit which comprises an inversion circuit and an incrementer. Moreover, when the subtraction result becomes negative, the complement circuit 451 carries out the complement process. Then, the result 423 is normalized by the normalization 410, and if required, the increment process is carried out by the discarding or raising circuit 450. Moreover, 452 designates a renormalization circuit, and when digit raising is carried out on the discarding or raising process, the same circuit 452 carries out renormalization by shifting the data to be processed by one bit in the right direction.

Incidentally, even if the above-mentioned mantissa part operation means 401 has construction as shown in FIGS. 22 and 23, it is possible to divide the respective constructional members of the same means 401 into the first and the second field in the same manner as in the embodiment shown in FIG. 11, and to operate these divided parts independently. Thus, two sets of different single-precision numerical data can be processed at the same time also in such modification.

As stated above, by adding a small number of circuits for making the mantissa part operation means be dividable into the first and the second fields, it becomes possible to make the execution speed of the single-precision numerical operation be twice the conventional level. Moreover, it is possible to variously modify the construction of the index part operation means based on the present invention. However, since the occupation ratio of hardware of the index part operation means is very low as compared with the other sections in the entire arithmetic operation unit, it is possible to achieve the object of the present invention in a construction which has the same means.

Moreover, in these embodiments, though the case where the operation section is a floating point numerical operation unit is mentioned, it is also possible to use another operation unit having such construction that can also execute many kinds of arithmetic operations, such as the single-precision operation, the double-precision operation and the single-precision-double-speed operation.

As stated above, according to the present invention, by addition of a small amount of hardware, it becomes possible to use the relatively expensive mantissa part operation means extremely effectively, so as to provide a high-speed floating-decimal-point numerical operation unit which can execute the single-precision operation at double the speed of the conventional unit.

Various modifications will become possible for those skilled in the art after receiving the teachings of the present disclosure without departing from the scope thereof.

What is claimed is:

1. A pipeline information processing circuit for floating point arithmetic operations comprising:

register control means for outputting a plurality of data held in registers at a time, each of the plurality of data including a mantissa part, a sign part and an exponent part;

arithmetic operation means for carrying out a collective arithmetic operation of the plurality of data; and bypass control means for comparing an operation result outputted from the arithmetic operation means and a data outputted from the register control means, selecting a data to be an object of a next arithmetic operation, and transferring the selected data to the arithmetic operation means through a suitable bypass, wherein the bypass control means has a flag holding means for holding flags which respectively designate whether or not each data inputted to the arithmetic operation is used in an actual arithmetic operation, wherein the arithmetic operation means comprises an operation unit which includes a mantissa unit for holding the mantissa part of said each of the plurality of data, a sign unit for holding the sign part of said each of the plurality of data, and an exponent unit for holding the exponent part of said each of the plurality of data, said arithmetic unit operated in a first operation mode for carrying out a double-precision numerical operation, and a second operation mode for carrying out a single-precision numerical operation, wherein said mantissa unit is divided into two separate parts capable of executing a double-precision numerical operation in combination and two single-precision numerical operations in parallel, the two separate parts being divided into two separate mantissa units when performing the two single-precision numerical operations in parallel, wherein the sign unit and the exponent unit are not divided but instead are provided as a pair of units for performing the two single-precision numerical operations in parallel, and wherein one of the pair of units is operable for performing either the double-precision numerical operation or the single-precision numerical operation and an other of the pair of units is operable for performing only the single-precision numerical operation.

2. The pipeline information processing circuit according to claim 1, further comprising comparison means for comparing a register number of each operation result of the arithmetic operation means with a register number of each data to be an object of the next arithmetic operation, and selecting means for selecting an operation result outputted from the arithmetic operation means as data to be an object of the next operation when a comparison result on the register numbers obtained by the comparison means is the same and the flags designate that the data is used in the arithmetic operation.

3. The pipeline information processing circuit according to claim 1, wherein the arithmetic operation means comprises an operation unit which comprises:

first operation means which has a bit width sufficient for carrying out a first operation, and is operated in a first operation mode for carrying out the first operation and a second operation mode for carrying out a second operation, second operation means having a bit width sufficient at least for carrying out a first part of the second operation, third operation means which has a bit width sufficient for carrying out the first operation, and is operated in the first operation mode and the second operation mode, fourth operation means having a bit width sufficient at least for carrying out a second part of the second operation, and fifth operation means which has a bit width sufficient for carrying out the first operation, and is operated in the first operation mode, the second operation mode and a third operation mode for carrying out two different sets of second operations are carried out at a time.

4. The pipeline information processing circuit according to claim 3, wherein the first operation is for m bit data, the second operation is for no bit data, and the m and ni have a following relationship, $$\Sigma ni \geq m.$$

5. The pipeline information processing circuit according to claim 3, wherein the first operation is a double-precision numerical operation, the second operation is a single-precision numerical operation, and the operation unit is a floating-decimal-point numerical operation unit.

6. The pipeline information processing circuit according to claim 3, wherein the first operation means is a first mark part operation unit, the second operation means is a second mark part operation unit, the third operation means is a first index part operation unit, the fourth operation means is a second index part operation unit, and the fifth operation means is a mantissa part operation unit.

7. An operation unit for floating point arithmetic operations, comprising:

first operation means which has a bit width sufficient for carrying out a first operation, and can be operated in a first operation mode for carrying out the first operation and a second operation mode for carrying out a second operation, second operation means having a bit width sufficient at least for carrying out the second operation, third operation means which has a bit width sufficient for carrying out the first operation, and can be operated in the first operation mode and the second operation mode, fourth operation means having a bit width sufficient at least for carrying out the second operation, and fifth operation means which has a bit width sufficient for carrying out the first operation, and is operated in the first operation mode, the second operation mode and a third operation mode for carrying out two different sets of second operations are carried out at a same time.

8. The operation unit according to claim 7, wherein the first operation is for m bit data, the second operation is for ni bit data, and the m and ni have a following relationship, $$\Sigma n i \geqq m.$$

9. The operation unit according to claim 7, wherein the first operation is a double-precision numerical operation, the second operation is a single-precision numerical operation, and the operation unit is a floating point numerical operation unit.

10. The operation unit according to claim 9, wherein the first operation means is a first mark part operation unit, the second operation means is a second mark part operation unit, the third operation means is a first index part operation unit, the fourth operation means is a second index part operation unit, and the fifth operation means is a mantissa part operation unit.

11. The operation unit according to claim 10, wherein a numerical operation is carried out by using the first operation means, the third operation means and the fifth operation means in the first operation mode for carrying out the double-precision numerical operation, another floating point numerical operation is carried out by using either the first or the second operation means, either the third or the fourth operation means and the fifth operation means in the second operation mode, and two sets of floating point numerical operations are carried out by using both of the first and the second operation means, both of the third and the fourth operation means and the fifth operation means for carrying out two different sets of single-precision numerical operations at a time.

12. A pipeline information processing circuit comprising:

a register file composed of a plurality of registers designated by register numbers for storing a plurality of data;

an arithmetic logic unit capable of performing a first arithmetic operation of multiple-precision by receiving two multiple-precision data items respectively through first and second input ports to perform said first arithmetic operation and outputting a result of said first arithmetic operation through an output port;

each of said first and second input ports comprising a plurality of fields each capable of independently receiving a single-precision data item, said output port comprising a plurality of fields each capable of independently outputting a single-precision data item in correspondence with one of said fields of each of said first and second input ports;

said arithmetic logic unit being capable of performing a plurality of single-precision second arithmetic operations in parallel by carrying out respective separate arithmetic operations of said single-precision data items input through the corresponding fields of said first input port and said single-precision data items input through the corresponding fields of said second input port as executed data, said arithmetic unit providing said executed data on said plurality of fields of said output port;

an output register connected to said output port of said arithmetic logic unit and to said register file, said output register comprising a plurality of fields and configured to store said respective executed data from each of said plurality of fields of said outport into a corresponding one of said plurality of fields of said output register, said output register transferring said executed data to said register file as writeback data; and a controller connected with said register file and said arithmetic logic unit and said output register and provided witch a plurality of selectors through which one of said executed data and said writeback data is transferred in a by-pass configuration from at least one of (1) said fields of said output port of said arithmetic logic unit and (2) at least one of said fields of said output register to any of the fields of said first and second input ports of said arithmetic logic unit, and through which data is transferred in a non-bypass configuration from said register file to any of said fields of said first and second input ports of said arithmetic logic unit.

13. The pipeline information processing circuit as claimed in claim 12 wherein said arithmetic logic unit includes two exponent operation means, one of which is designed for calculation of said single-precision and another of which is designed for calculation of said multiple-precision.

14. The pipeline information processing circuit as claimed in claim 12 wherein said arithmetic logic unit is an adder-subtractor.

15. The pipeline information processing circuit as claimed in claim 12 wherein said multiple-precision is double-precision.

16. The pipeline information processing circuit as claimed in claim 12 wherein said arithmetic logic unit is composed of a plurality of individual parts each capable of independently performing said second arithmetic operations and performing said first arithmetic operation in cooperation.

17. The pipeline information processing circuit as claimed in claim 12 wherein said controller is provided further with a comparator for comparing the register numbers of the registers in which calculation result of said arithmetic logic unit being transferred from said fields of said output port to said output register are to be stored with the register numbers of the registers in which the result of a previous calculation result be said arithmetic logic unit being transferred from said fields of said output register to said register file are to be stored along with the register numbers of the registers from which an operand is to be taken but not yet actually taken for a calculation in said arithmetic logic unit.

18. The pipeline information processing circuit as claimed in claim 17 wherein each of said selectors is capable of directly transferring the result of the calculation by said arithmetic logic unit to one of said fields of said first and second input ports of said arithmetic logic unit when the register number of the register in which the result of the calculation by said arithmetic logic unit is to be stored equals the register number of the register from which an operand is to be taken for said calculation in said arithmetic logic unit, at the same time as another selector transfers a data item from one register to another one of said fields of said first and second input ports.

19. The pipeline information processing circuit as claimed in claim 17, wherein said controller is further provided with a priority judgment circuit, wherein when the comparison result indicates a coincidence in the respective register numbers, said priority judgment circuit determines a highest priority of the respective register numbers to be used for the operand to be taken as said writeback data, a second highest priority as said executed data, and a third highest priority as data received from said register file.

20. The pipeline information processing system circuit as claimed in claim 17, wherein said pipeline information processing circuit operates in at least four pipeline stages, including a fetch stage for fetching instructions, a decode stage for decoding and loading said instructions, an execution stage for executing said instructions, and a write-back stage for writing back data based on said executing of said instructions to said register file, and wherein data is latched into said input ports of said arithmetic logic unit during said decode stage, said executed data is transferred from said output ports of said arithmetic logic unit to said output register during said execution stage, and said writeback data is transferred from said output register to said register file during said write-back stage, and wherein said plurality of selectors include a priority judgment circuit for determining a coincidence between a register number needed by an instruction obtained during said fetch stage and at least one of (1) a register number corresponding to said executed data received from said output port of said arithmetic logic unit, and (2) a register number corresponding to said writeback data received from said output register, and wherein when said coincidence occurs, said executed data received from said output register takes precedence over said writeback data received from said output port of said arithmetic logic unit for use as said data for the register number for said fetch stage, and when neither the register number corresponding to said writeback data nor the register number corresponding to said executed data respectively received from said output register and said output port of said arithmetic logic unit are coincident with the register number needed by said instruction obtained during said fetch stage, said data from the register number for said fetch stage is taken from said register file.

21. The pipeline information processing circuit as claimed in claim 12 wherein said controller is further provided with storage means for storing flags indicating whether said executed data transferred from said output port of said arithmetic logic unit and said writeback data transferred from said output register are each valid or not.

22. A pipeline information processing circuit for floating point arithmetic operation comprising:

a register file composed of a plurality of registers designated by register numbers for storing a plurality of data;

an arithmetic logic unit capable of performing a first arithmetic operation of a multiple-precision by receiving two data items of said multiple-precision respectively through first and second input ports to perform said first arithmetic operation and outputting a result of said first arithmetic operation through an output port as executed data, said arithmetic logic unit writing said executed data back to said register file as writeback data, each of said first and second input ports comprising a plurality of fields each capable of independently receiving a data item of a single-precision, said output port comprising a plurality of fields each capable of independently outputting a data item of said single-precision in correspondence with one of said fields of each of said first and second input ports;

said arithmetic logic unit being capable of performing a plurality of second arithmetic operations of said single-precision in parallel by carrying out respective separate arithmetic operations of said data items input through said respective fields of said first input port and said data items input through the corresponding fields of said second input port; and a bypass controller connected with said register file and said arithmetic logic unit and provided with a plurality of selectors through which the data is transferred selectively from said register file and/or at least one of said fields of said output port of said arithmetic logic unit to any one of the fields of said first and second input ports of said arithmetic logic unit, said bypass controller being provided further with storage means for storing flags indicating whether the data transferred from said output port of said arithmetic logic unit is valid or not, wherein said pipeline information processing circuit has at least a fetch cycle, a decode cycle, an execute cycle, and a writeback cycle, and when a first instruction is in said decode cycle, a second instruction is in said execute cycle, and a third instruction is in said writeback cycle, a register number corresponding to where a result of said third instruction is to be transferred to in said register file is compared to a register number corresponding to where a result of said second instruction is to be transferred to in said register file and is also compared to a register number corresponding to an operand of said first instruction which is to be taken but has not yet been taken for a calculation in said arithmetic logic unit, and if the register number corresponding to said third instruction is coincident with the register number corresponding to said first instruction, said writeback data is used as said operand, and if the register number corresponding to said third instruction is not coincident with the register number corresponding to said first instruction but is coincident with the register number corresponding to said second instruction, said executed data is used as said operand, otherwise data from said register file is used as said operand.

* * * * *